(12) United States Patent
Kitagawa

(10) Patent No.: US 10,532,745 B2
(45) Date of Patent: Jan. 14, 2020

(54) VEHICLE AND CONTROL METHOD FOR VEHICLE

(71) Applicant: HONDA MOTOR CO., LTD., Minato-ku, Tokyo (JP)

(72) Inventor: Tetsuo Kitagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 15/911,273

(22) Filed: Mar. 5, 2018

(65) Prior Publication Data

US 2018/0257651 A1 Sep. 13, 2018

(30) Foreign Application Priority Data

Mar. 8, 2017 (JP) .................................. 2017-044336

(51) Int. Cl.
| | | |
|---|---|---|
| *B60W 30/188* | (2012.01) | |
| *B60W 10/08* | (2006.01) | |
| *B60L 15/20* | (2006.01) | |
| *B60W 20/00* | (2016.01) | |

(52) U.S. Cl.
CPC ....... *B60W 30/188* (2013.01); *B60L 15/2036* (2013.01); *B60W 10/08* (2013.01); *B60L 2240/24* (2013.01); *B60L 2240/423* (2013.01); *B60W 20/00* (2013.01); *B60W 2510/12* (2013.01); *B60W 2710/085* (2013.01); *Y10S 903/906* (2013.01)

(58) Field of Classification Search
CPC . B60W 30/188; B60W 10/08; B60L 15/2036; B60L 2240/24

USPC .......................................................... 701/22
See application file for complete search history.

(56) References Cited

U.S. PATENT DOCUMENTS

| | | | | |
|---|---|---|---|---|
| 2008/0035411 A1* | 2/2008 | Yamashita | ............. | B62D 5/046 180/443 |
| 2012/0271516 A1* | 10/2012 | Takahashi | ............ | B62D 5/0466 701/42 |
| 2013/0260956 A1 | 10/2013 | Noguchi et al. | | |
| 2013/0261864 A1* | 10/2013 | Noguchi | ................. | B60L 15/20 701/22 |
| 2014/0025241 A1* | 1/2014 | Andou | ................... | B60K 28/16 701/22 |

FOREIGN PATENT DOCUMENTS

| | | |
|---|---|---|
| JP | 11-125129 | 5/1999 |
| JP | 2015-107040 | 6/2015 |

OTHER PUBLICATIONS

Japanese Office Action for Japanese Patent Application No. 2017-044336 dated Sep. 4, 2018.

* cited by examiner

*Primary Examiner* — Yazan A Soofi

(74) *Attorney, Agent, or Firm* — Amin, Turocy & Watson, LLP

(57) ABSTRACT

A monitor unit of a vehicle acquires an object left-right difference parameter corresponding to a command left-right difference parameter or corresponding to a measurement left-right difference parameter. The monitor unit compares the object left-right difference parameter and a first left-right difference threshold. If the object left-right difference parameter exceeds a first left-right difference threshold, the monitor unit limits the motive power of a first rotary electric machine and a second rotary electric machine.

7 Claims, 14 Drawing Sheets

VEHICLE AND CONTROL METHOD FOR VEHICLE

CROSS-REFERENCE TO RELATED APPLICATION

This application is based upon and claims the benefit of priority from Japanese Patent Application No. 2017-044336 filed on Mar. 8, 2017, the contents of which are incorporated herein by reference.

BACKGROUND OF THE INVENTION

Field of the Invention

The present invention relates to a vehicle capable of torque vectoring to change a travel direction by adjusting a difference in motive power between a left driving wheel and a right driving wheel, and a control method for such a vehicle.

Description of the Related Art

U.S. Patent Application Publication No. 2013/0260956 (hereinafter referred to as "US 2013/0260956 A1") has an object to provide a vehicle driving device with excellent controllability ([0008]). To achieve the object, in US 2013/0260956 A1 (Abstract), ring gear unlocked limit torques corresponding to limit torques of a first electric motor 2A and a second electric motor 2B after the switching from a ring gear locked state to a ring gear unlocked state is set to a value whose absolute value is higher than that of upper-limit torques or ring gear locked limit torques of the first electric motor 2A and the second electric motor 2B in the ring gear locked state at the time of switching. Alternatively, the ring gear unlocked limit torques are set to a value substantially equal to the upper-limit torques or the ring gear locked limit torques of the first electric motor 2A and the second electric motor 2B in the ring gear locked state at the time of the switching. Then, control is performed so that the torques generated by the first electric motor 2A and the second electric motor 2B become less than the ring gear unlocked limit torques.

In the command torque control in the ring gear unlocked state, the first electric motor 2A and the second electric motor 2B are caused to generate a left-right difference torque between a left rear wheel LWr and a right rear wheel RWr, so that a predetermined yaw moment is generated ([0083] to [0096]).

In Japanese Laid-Open Patent Publication No. 2015-107040 (hereinafter referred to as "JP 2015-107040 A"), it is an object to provide an electric vehicle with excellent redundancy ([0009] and Abstract). In order to achieve this object, a control system 100 according to JP 2015-107040 A (Abstract) includes a first limiting unit 97 and a second limiting unit 93. The first limiting unit 97, when acquiring the fact of the ring gear unlocked state, controls the torques of the first electric motor 2A and the second electric motor 2B so as to be within a first ring gear unlocked limit torque. The second limiting unit 93 is provided separately from the first limiting unit 97, and controls so that the torques of the first electric motor 2A and the second electric motor 2B are within a second ring gear unlocked limit torque.

In the command torque control in JP 2015-107040 A as well, a predetermined yaw moment is generated by causing the first electric motor 2A and the second electric motor 2B to generate a left-right difference torque between a left rear wheel LWr and a right rear wheel RWr ([0058] to [0070]).

SUMMARY OF THE INVENTION

As described above, in US 2013/0260956 A1 and JP 2015-107040 A, a desired yaw moment is generated by causing the first electric motor 2A and the second electric motor 2B to generate a left-right difference torque between the left rear wheel LWr (left driving wheel) and the right rear wheel RWr (right driving wheel). In the structure where the desired yaw moment is generated by the left-right difference torque, an unintended turning movement (deflection) may occur because of a difference between the command value of the yaw moment (command yaw moment) and the actual yaw moment. In US 2013/0260956 A1 and JP 2015-107040 A, however, there is a room for improvement to suppress such an unintended turning movement.

The present invention has been made in consideration of the problem as above, and it is an object of the present invention to provide a vehicle in which the unintended turning movement (deflection) is suppressed as appropriate, and a control method for such a vehicle.

A vehicle according to the present invention includes a first rotary electric machine configured to generate motive power to be transmitted to a left driving wheel; a second rotary electric machine configured to generate motive power to be transmitted to a right driving wheel; and a motive power control unit configured to control the motive power of the first rotary electric machine and the second rotary electric machine, the motive power control unit including: a left-right difference calculation unit configured to calculate a command left-right difference parameter as a difference between a first command motive power parameter corresponding to a command value of a first motive power parameter expressing the motive power generated by the first rotary electric machine and a second command motive power parameter corresponding to a command value of a second motive power parameter expressing the motive power generated by the second rotary electric machine; and a monitor unit configured to monitor the left-right difference calculation unit, wherein: the monitor unit is configured to acquire an object left-right difference parameter corresponding to the command left-right difference parameter or corresponding to a measurement left-right difference parameter as a difference between a measurement value of the first motive power parameter and a measurement value of the second motive power parameter; the monitor unit is configured to compare the object left-right difference parameter and a first left-right difference threshold; and if the object left-right difference parameter exceeds the first left-right difference threshold, the monitor unit is configured to limit the motive power of the first rotary electric machine and the second rotary electric machine.

According to the present invention, if the object left-right difference parameter (such as an object left-right difference torque) exceeds the first left-right difference threshold, the motive power of the first rotary electric machine and the second rotary electric machine is limited. Thus, if it is possible to determine that there is an abnormality in a difference in motive power between the first and second rotary electric machines due to some reason, the motive power of the vehicle can be controlled suitably by limiting the motive power of the first and second rotary electric machines.

If the command left-right difference parameter is the object left-right difference parameter, the abnormality in a difference in motive power between the first and second rotary electric machines can be determined quickly. If the measurement left-right difference parameter is the object left-right difference parameter, the abnormality in a difference in motive power between the first and second rotary electric machines can be determined accurately because the actual operation of the first and second rotary electric machines is reflected.

The motive power control unit may further include: a command total parameter calculation unit configured to calculate a command total parameter corresponding to a command value of a vehicle motive power parameter expressing motive power of the entire vehicle; a command parameter calculation unit configured to calculate the first command motive power parameter and the second command motive power parameter on a basis of the command total parameter and the command left-right difference parameter; and an electric power control unit configured to control electric power to be supplied to the first rotary electric machine on a basis of the first command motive power parameter, and controls electric power to be supplied to the second rotary electric machine on a basis of the second command motive power parameter.

If the object left-right difference parameter exceeds the first left-right difference threshold, the monitor unit may be configured to limit the motive power of the first rotary electric machine and the second rotary electric machine by decreasing the electric power to be supplied to the first rotary electric machine and the second rotary electric machine.

Thus, as compared to the case in which the motive power of the first rotary electric machine and the second rotary electric machine is limited by a mechanical structure, for example, the motive power of the first rotary electric machine and the second rotary electric machine can be limited by a relatively simple method.

The monitor unit can, for example, decrease the electric power to be supplied to the first rotary electric machine and the second rotary electric machine by any of the following: decreasing the command total parameter, decreasing the first command motive power parameter and the second command motive power parameter, and decreasing the electric power to be supplied to the first rotary electric machine and the second rotary electric machine.

The vehicle may further include a third motive power source that is different from the first rotary electric machine and the second rotary electric machine. When the monitor unit limits the motive power of the first rotary electric machine and the second rotary electric machine, the motive power control unit may be configured to cause the vehicle to continue to travel by the motive power from the third motive power source. Thus, even when the motive power of the first rotary electric machine and the second rotary electric machine is limited, the travel of the vehicle can be continued.

If the object left-right difference parameter exceeds the first left-right difference threshold, the monitor unit may be configured to decrease the motive power of the first rotary electric machine and the second rotary electric machine to zero. Thus, if it is determined that there is an abnormality in the first rotary electric machine and the second rotary electric machine due to some reason, the use of the first rotary electric machine and the second rotary electric machine can be canceled.

Alternatively, if the object left-right difference parameter exceeds the first left-right difference threshold, the monitor unit may be configured to decrease a left-right difference torque of the first rotary electric machine and the second rotary electric machine to zero. Thus, if it is determined that there is an abnormality in the first rotary electric machine and the second rotary electric machine due to some reason, the torque vectoring by the first rotary electric machine and the second rotary electric machine can be canceled.

The monitor unit may be configured to change the first left-right difference threshold in accordance with a vehicle speed of the vehicle. Thus, whether there is an abnormality in a difference in motive power between the first rotary electric machine and the second rotary electric machine can be determined in accordance with the vehicle speed.

A control method for a vehicle according to the present invention is a control method for a vehicle including a torque vectoring mechanism that changes a travel direction by adjusting a difference in motive power between a left driving wheel and a right driving wheel, the vehicle including: a left-right difference calculation unit configured to calculate a command left-right difference parameter as a difference between a first command motive power parameter corresponding to a command value of a first motive power parameter expressing motive power to be transmitted to the left driving wheel and a second command motive power parameter corresponding to a command value of a second motive power parameter expressing motive power to be transmitted to the right driving wheel; and a monitor unit configured to monitor the left-right difference calculation unit, the method comprising the steps of: acquiring an object left-right difference parameter corresponding to the command left-right difference parameter or corresponding to a measurement left-right difference parameter as a difference between a measurement value of the first motive power parameter and a measurement value of the second motive power parameter, by the monitor unit; comparing the object left-right difference parameter and a first left-right difference threshold by the monitor unit; and limiting the motive power to be transmitted to the left driving wheel and the right driving wheel by the monitor unit if the object left-right difference parameter exceeds the first left-right difference threshold.

According to the present invention, if the object left-right difference parameter (such as the object left-right difference torque) exceeds the first left-right difference threshold, the motive power to be transmitted to the left driving wheel and the right driving wheel is limited. Thus, if it is possible to determine that there is an abnormality in a difference in motive power between the left driving wheel and the right driving wheel due to some reason, the motive power of the vehicle can be controlled suitably by limiting the motive power to be transmitted to the left driving wheel and the right driving wheel.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A. Embodiment

A-1. Structure

[A-1-1. Overall Structure]

Figure 1:
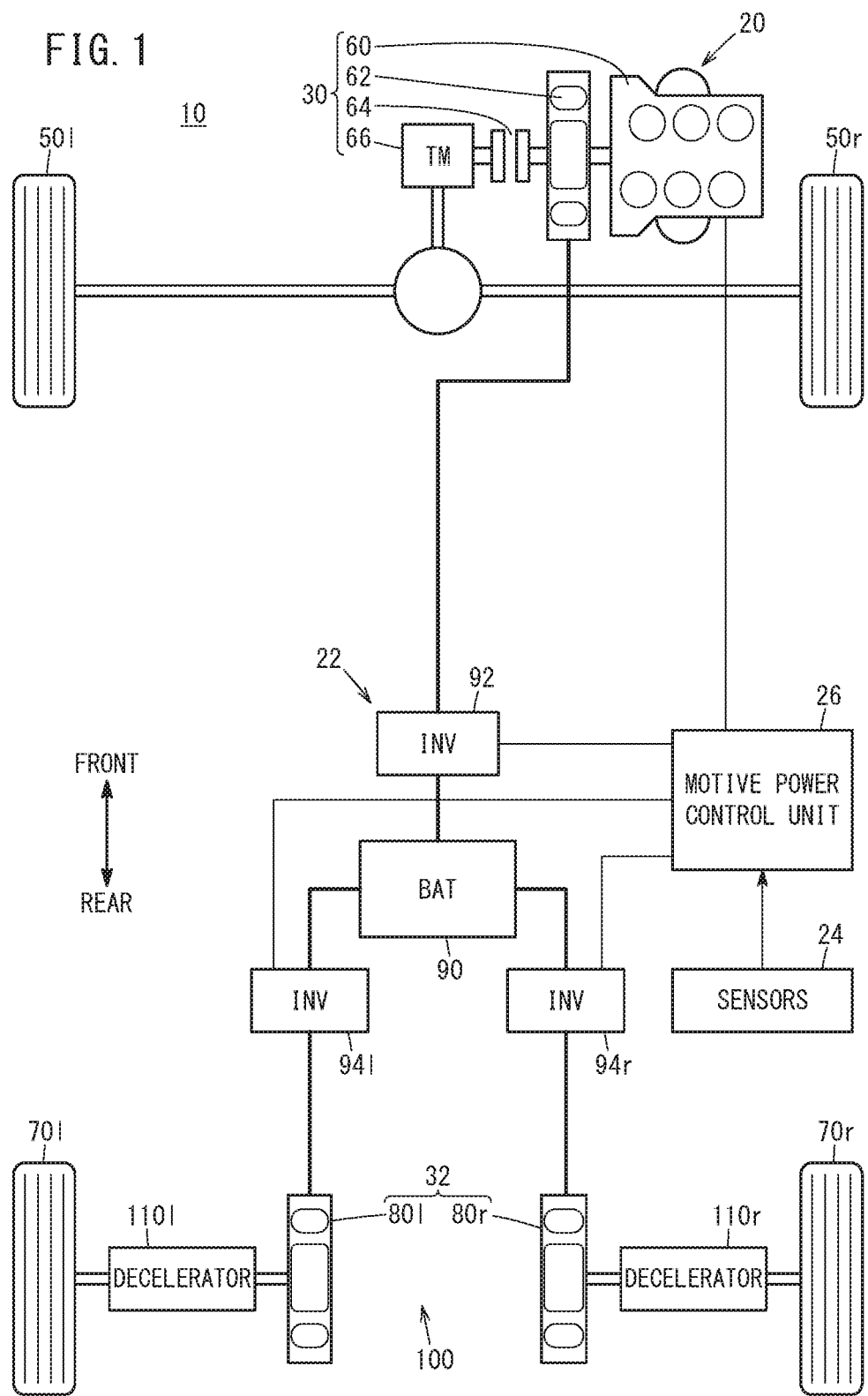
FIG. 1 is a schematic structure diagram of a part of a vehicle according to one embodiment of the present invention.

FIG. 1 is a schematic structure diagram of a part of a vehicle 10 according to one embodiment of the present invention. The vehicle 10 includes a driving system 20, an electric power system 22, sensors 24, and a motive power control unit 26.

The driving system 20 generates the travel power of the vehicle 10, and includes a front-wheel driving device 30 and a rear-wheel driving device 32. The front-wheel driving device 30 drives a left front wheel 50*l* and a right front wheel 50*r* (hereinafter referred to as "front wheels 50*l*, 50*r*" or collectively referred to as "front wheels 50"). The front-wheel driving device 30 includes an engine 60, a first traction motor 62, a clutch 64, and a transmission 66.

The rear-wheel driving device 32 drives a left rear wheel 70*l* and a right rear wheel 70*r* (hereinafter referred to as "rear wheels 70*l*, 70*r*" or collectively referred to as "rear wheels 70"). The rear-wheel driving device 32 includes a second traction motor 80*l* and a third traction motor 80*r*. The front-wheel driving device 30 and the rear-wheel driving device 32 are mechanically disconnected from each other and are provided independently of each other.

The electric power system 22 supplies electric power to the first to third traction motors 62, 80*l*, 80*r*, and includes a high-voltage battery 90 and first to third inverters 92, 94*l*, 94*r*.

The sensors 24 detect information on each part of the vehicle 10, and output the information to the motive power control unit 26. The motive power control unit 26 (hereinafter also referred to as "control unit 26") controls the motive power of the engine 60 and the first to third traction motors 62, 80*l*, 80*r* on the basis of the information from the sensors 24 (sensor values).

The second motor 80*l* and the third motor 80*r*, the sensors 24, and the motive power control unit 26 form a torque vectoring mechanism 100. The torque vectoring mechanism 100 changes the travel direction of the vehicle 10 by adjusting the difference in motive power between the left rear wheel 70*l* (left driving wheel) and the right rear wheel 70*r* (right driving wheel).

[A-1-2. Driving System 20]

(A-1-2-1. Front-Wheel Driving Device 30)

The front-wheel driving device 30, for example, performs the driving only by the engine 60 when the load is medium, and performs the driving by the engine 60 and the first motor 62 when the load is high. The front-wheel driving device 30 may perform the driving only by the first motor 62 when the load of the vehicle 10 is low.

The engine 60 (third motive power source) may be, for example, a six-cylinder engine; however, the engine 60 may be other engine such as a two-cylinder engine, a four-cylinder engine, or an eight-cylinder engine. The engine 60 is not limited to a gasoline engine and may be other engine such as a diesel engine.

The first traction motor 62 (third motive power source) generates the travel power for the vehicle 10 and moreover generates electric power by the motive power of the engine 60. In addition, the first traction motor 62 performs cranking of rotating a crank shaft, which is not shown, of the engine 60 when the engine 60 is started.

The first motor 62 is, for example, a three-phase AC brushless type but may be another motor such as a three-phase AC brush type, a single-phase AC type, or a DC type. The specification of the first motor 62 may be equal to or different from the specification of the second motor 80*l* and the third motor 80*r*. The first motor 62 can generate a torque in a forward rotation (rotation that makes the vehicle 10 travel forward) and a torque in a backward rotation (rotation that makes the vehicle 10 travel backward).

In the description below, the first traction motor 62 is also referred to as a cranking motor 62, a CRK MOT 62, a CRK motor 62, or a motor 62. In the present embodiment, another cranking motor (or cell motor) is not provided in addition to the first traction motor 62; however, another cranking motor may be provided. The motive power of the engine 60 and the first traction motor 62 is also referred to as a front-wheel motive power.

The clutch 64 is disposed between the transmission 66 and a combination of the engine 60 and the CRK MOT 62. When the clutch 64 is on (connected state), the motive power of the engine 60 and the CRK MOT 62 can be transmitted to the front wheels 50 and the motive power from the rear wheels 70 can be transmitted to the CRK MOT 62 and the regeneration becomes possible. When the clutch 64 is off (disconnected state), the motive power of the engine 60 and the CRK MOT 62 is not transmitted to the front wheels 50. In this case, the CRK MOT 62 can generate the electric power by the motive power of the engine 60.

The transmission 66 of the present embodiment is an automatic transmission. However, the transmission 66 may be other transmission such as a manual transmission.

(A-1-2-2. Rear-Wheel Driving Device 32)

The second motor 80*l* (first rotary electric machine) has an output shaft connected to a rotation shaft of the left rear wheel 70*l*, and transmits the motive power to the left rear wheel 70*l*. The third motor 80*r* (second rotary electric machine) has an output shaft connected to a rotation shaft of the right rear wheel 70*r*, and transmits the motive power to the right rear wheel 70*r*. Between the second traction motor 80*l* and the third traction motor 80*r*, and the rear wheels 70, decelerators 110*l*, 110*r* are provided. In addition, a clutch that is not shown may be provided.

The decelerators 110*l*, 110*r* switch between a ring gear locked state and a ring gear unlocked state on the basis of a command from the motive power control unit 26. As a specific structure of each of the decelerators 110*l*, 110*r*, the structure as disclosed in US 2013/0260956 A1 and JP 2015-107040 A can be used.

The second traction motor 80*l* and the third traction motor 80*r* generate the travel power for the vehicle 10, and moreover generate electric power by the motive power from the rear wheels 70. In the description below, the second traction motor 80*l* and the third traction motor 80*r* are also referred to as TRC MOTs 80*l*, 80*r*, TRC motors 80*l*, 80*r*, left and right TRC motors 80*l*, 80*r*, or motors 80*l*, 80*r*, and are collectively referred to as TRC MOTs 80 or motors 80. In addition, the motive power transmitted from the front-wheel driving device 30 to the rear wheels 70 is referred to as a front-wheel motive power.

The second motor 80*l* and the third motor 80*r* are, for example, a three-phase AC brushless type but may be another motor such as a three-phase AC brush type, a single-phase AC type, or a DC type. The specification of the second motor 80*l* and the third motor 80*r* may be equal to or different from the specification of the first motor 62. The second motor 80*l* and the third motor 80*r* can generate torques in a forward rotation (rotation that makes the vehicle 10 travel forward) and torques in a backward rotation (rotation that makes the vehicle 10 travel backward).

[A-1-3. Electric Power System 22]

The high-voltage battery 90 supplies electric power to the first to third motors 62, 80*l*, 80*r*, through the first to third inverters 92, 94*l*, 94*r*, and stores regeneration electric power Preg from the first to third motors 62, 80*l*, 80*r*.

The battery 90 is a power storage device (energy storage) including a plurality of battery cells, and may be, for example, a lithium ion secondary battery, a nickel-hydrogen secondary battery, or the like. Instead of the battery 90, a power storage device such as a capacitor can be used. Note that a DC/DC converter that is not shown may be provided between the battery 90 and the first to third inverters 92, 94*l*, 94*r*, so as to increase (step up) or decrease (step down) the output voltage of the battery 90 or the output voltages of the first to third motors 62, 80*l*, 80*r*.

Each of the first to third inverters 92, 94*l*, 94*r* has a three-phase full-bridge type structure, and performs DC/AC conversion. That is to say, the first to third inverters 92, 94*l*, 94*r* convert the DC into three-phase AC, and supplies the AC to the first to third motors 62, 80*l*, 80*r*. The first to third inverters 92, 94*l*, 94*r* supply to the battery 90, the DC after the AC/DC conversion caused by the regeneration operation of the first to third motors 62, 80*l*, 80*r*.

[A-1-4. Sensors 24]

Figure 2:
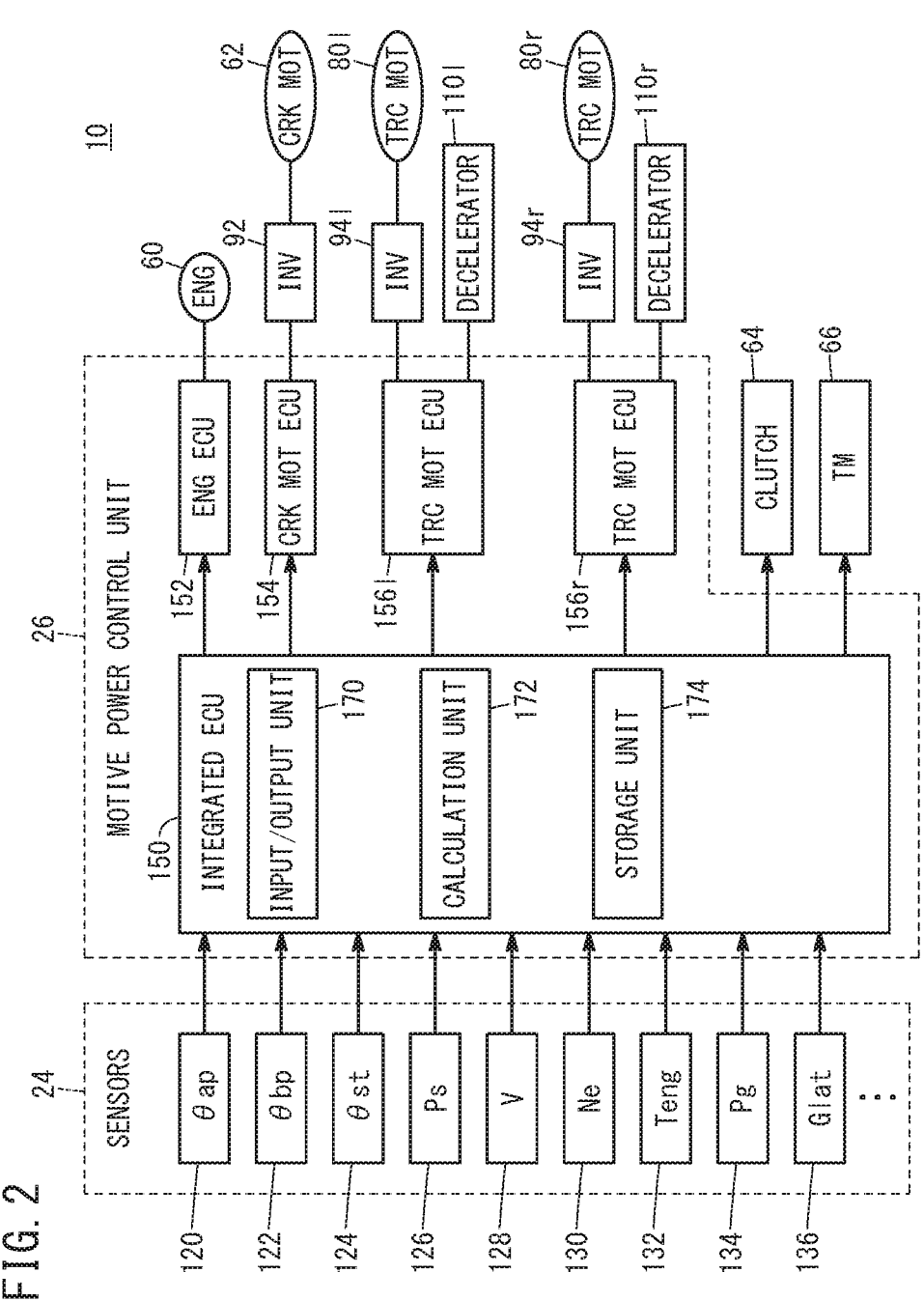
FIG. 2 is a block diagram illustrating specific structure components of sensors and a motive power control unit according to the embodiment.

FIG. 2 is a block diagram illustrating specific structure components of the sensors 24 and the motive power control unit 26 according to the present embodiment. As illustrated in FIG. 2, the sensors 24 include an accelerator pedal sensor 120, a brake pedal sensor 122, a steering angle sensor 124, a shift position sensor 126, a vehicle speed sensor 128, an engine speed sensor 130, an engine torque sensor 132, a gear position sensor 134, and a lateral acceleration sensor 136.

The accelerator pedal sensor 120 (also referred to as "AP sensor 120") detects an amount θap [%] of operating an accelerator pedal that is not shown (also referred to as "AP operation amount θap"). The brake pedal sensor 122 (also referred to as "BP sensor 122") detects an amount θbp [%] of operating a brake pedal that is not shown (also referred to as "BP operation amount θbp"). The steering angle sensor 124 detects a steering angle θst [degrees] of a steering wheel that is not shown.

The shift position sensor 126 detects a shift position Ps (such as N, P, D, and R). The vehicle speed sensor 128 detects a vehicle speed V [km/h] of the vehicle 10. The engine speed sensor 130 (hereinafter also referred to as "Ne sensor 130") detects the engine speed Ne [rpm] corresponding to the number of rotations of the engine per unit time. The engine torque sensor 132 (hereinafter also referred to as "torque sensor 132") detects a torque Teng that is generated by the engine 60 (also referred to as "engine torque Teng" or "engine generated torque Teng").

The gear position sensor 134 detects a gear position Pg of the transmission 66 (such as a first gear or a second gear). The lateral acceleration sensor 136 detects a lateral acceleration Glat [m/s/s] of the vehicle 10.

[A-1-5. Motive Power Control Unit 26]

(A-1-5-1. Summary of Motive Power Control Unit 26)

As described above, the motive power control unit 26 controls the engine 60 and the first to third inverters 92, 94*l*, 94*r* on the basis of the sensor values from the sensors 24, so as to control the outputs of the engine 60 and the first to third motors 62, 80*l*, 80*r*. In addition, the motive power control unit 26 controls the clutch 64 and the transmission 66 in addition to the engine 60 and the first to third inverters 92, 94*l*, 94*r*, so as to control the motive power Fv (parameter of the motive power of the vehicle) of the entire vehicle 10.

As illustrated in FIG. 2, the motive power control unit 26 includes an integrated electronic control unit 150, an engine electronic control unit 152, a first motor electronic control unit 154, a second motor electronic control unit 156*l*, and a third motor electronic control unit 156*r*.

In the description below, the integrated electronic control unit 150 is referred to as "integrated ECU 150" or "ECU 150". The engine electronic control unit 152 is also referred to as "engine ECU 152", "ENG ECU 152", or "ECU 152". The first motor electronic control unit 154 is referred to as "first motor ECU 154", "first MOT ECU 154", "CRK MOT ECU 154", or "ECU 154". The second motor electronic control unit 156*l* is referred to as "second motor ECU 156*l*", "second MOT ECU 156*l*", "TRC MOT ECU 156*l*", "TRC motor ECU 156*l*", or "ECU 156*l*". The third motor electronic control unit 156*r* is referred to as "third motor ECU 156*r*", "third MOT ECU 156*r*", "TRC MOT ECU 156*r*", "TRC motor ECU 156*r*", or "ECU 156*r*".

The integrated ECU 150 calculates a command vehicle motive power Fvcom (command total parameter) corresponding to a command value of the motive power Fv of the entire vehicle 10, and a command yaw moment Ycom corresponding to a command value of a yaw moment Y of the vehicle 10. Then, based on the command vehicle motive power Fvcom and the command yaw moment Ycom, the integrated ECU 150 calculates command torques Tengcom, Tcrkcom, Ttrclcom, and Ttrcrcom of the engine 60, the first to third motors 62, 80l, 80r, respectively. In addition, the integrated ECU 150 generates a switch command to command switching between the ring gear locked state and the ring gear unlocked state of the decelerators 110l, 110r for the second motor ECU 156r and the third motor ECU 156l on the basis of the vehicle speed V, the gear position Pg, and the like.

The engine ECU 152 controls the engine 60 on the basis of the command torque Tengcom from the integrated ECU 150 (hereinafter also referred to as "command engine torque Tengcom"). The engine ECU 152 controls the engine 60 by, for example, adjusting the amount of fuel injection, controlling the ignition of the engine 60, or adjusting the opening of a throttle valve (not shown).

The first motor ECU 154 controls the first motor 62 on the basis of a command torque Tcrkcom from the integrated ECU 150 (also referred to as "command CRK motor torque Tcrkcom" or "command motor torque Tcrkcom").

The second motor ECU 156l (electric power control unit) controls the second motor 80l and the decelerator 110l on the basis of a command torque Ttrclcom from the integrated ECU 150 (also referred to as "command TRC motor torque Ttrclcom" or "command motor torque Ttrclcom"). The third motor ECU 156r (electric power control unit) controls the third motor 80r and the decelerator 110r on the basis of a command torque Ttrcrcom from the integrated ECU 150 (also referred to as "command TRC motor torque Ttrcrcom" or "command motor torque Ttrcrcom").

(A-1-5-2. Integrated ECU 150)

(A-1-5-2-1. Summary of Integrated ECU 150)

As illustrated in FIG. 2, the integrated ECU 150 includes an input/output unit 170, a calculation unit 172, and a storage unit 174. The input/output unit 170 performs input and output of signals between the integrated ECU 150 and another part. The input/output unit 170 may include an operation input/output device (human-machine interface (HMI)) for an occupant (including a driver).

The calculation unit 172 controls the motive power Fv of the vehicle 10 by executing programs stored in the storage unit 174, and includes, for example, a central processing unit (CPU). Among the functions achieved by the calculation unit 172, the functions related to outputs from the engine 60 and the motors 62, 80l, 80r will be described with reference to FIG. 3.

The calculation unit 172 controls the connection state of the clutch 64 and controls the gear position Pg of the transmission 66 using the AP operation amount θap, the vehicle speed V, or the like.

The storage unit 174 (FIG. 2) stores programs and data to be used by the calculation unit 172. The storage unit 174 includes, for example, a random access memory (hereinafter referred to as "RAM"). As the RAM, a volatile memory such as a register and a nonvolatile memory such as a flash memory can be used. The storage unit 174 may include a read only memory (hereinafter referred to as ROM) in addition to the RAM.

In the present embodiment, it is assumed that the programs and data used by the calculation unit 172 are stored in the storage unit 174 of the vehicle 10. However, for example, a part of the programs and data may be acquired from an external server (not shown) through a wireless device (not shown) included in the input/output unit 170.

(A-1-5-2-2. Functions Achieved by Calculation Unit 172)

Figure 3:
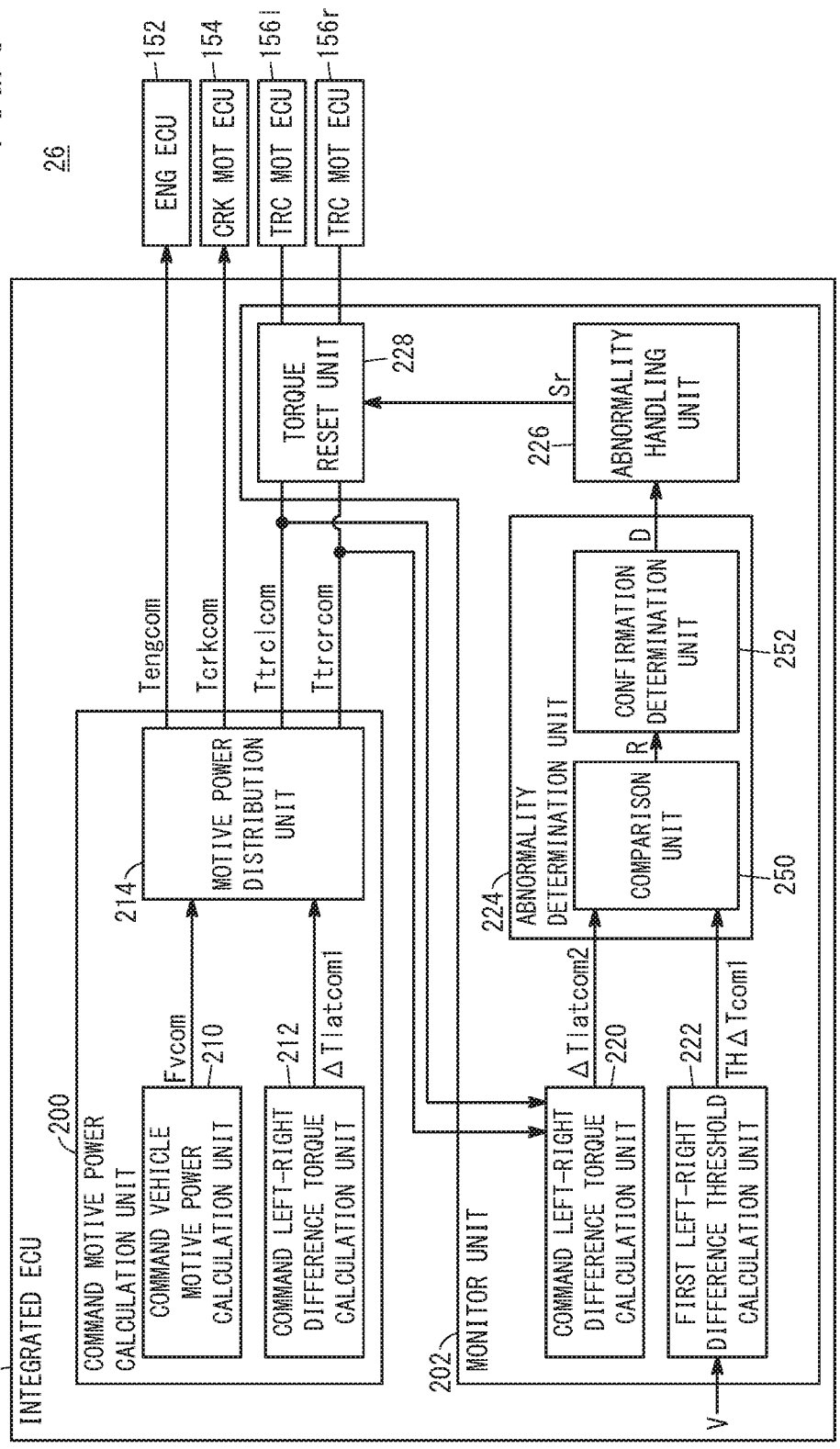
FIG. 3 is a block diagram illustrating the details of an integrated electronic control unit of the motive power control unit according to the embodiment.

FIG. 3 is a block diagram illustrating the details of the integrated ECU 150 of the motive power control unit 26 according to the present embodiment. As described above, the integrated ECU 150 calculates the command vehicle motive power Fvcom and the command yaw moment Ycom of the entire vehicle 10, and based on these, calculates the command torques Tengcom, Tcrkcom, Ttrclcom, and Ttrcrcom of the engine 60 and the first to third motors 62, 80l, 80r, respectively. The integrated ECU 150 commands the switching between the ring gear locked state and the ring gear unlocked state of the decelerators 110l, 110r on the basis of the vehicle speed V and the gear position Pg.

As illustrated in FIG. 3, the integrated ECU 150 (calculation unit 172) includes a command motive power calculation unit 200 and a monitor unit 202. The command motive power calculation unit 200 is a part (function) that calculates the command torques Tengcom, Tcrkcom, Ttrclcom, and Ttrcrcom of the engine 60 and the first to third motors 62, 80l, 80r, respectively. The command motive power calculation unit 200 includes a command vehicle motive power calculation unit 210, a command left-right difference torque calculation unit 212, and a motive power distribution unit 214. The monitor unit 202 monitors the command motive power calculation unit 200 (or command left-right difference torque ΔTlatcom).

(A-1-5-2-3. Command Motive Power Calculation Unit 200)

The command vehicle motive power calculation unit 210 (command total parameter calculation unit) calculates the command vehicle motive power Fvcom on the basis of the AP operation amount θap, the shift position Ps, the vehicle speed V, the engine speed Ne, the gear position Pg, or the like. The command vehicle motive power Fvcom is a command value of the motive power of the entire vehicle 10. The command vehicle motive power Fvcom corresponds to a total of the command values of the motive power (or torques) of the engine 60 and the first to third motors 62, 80l, 80r.

(A-1-5-2-4. Command Left-Right Difference Torque Calculation Unit 212)

The command left-right difference torque calculation unit 212 (left-right difference calculation unit) calculates the command yaw moment Ycom on the basis of the steering angle θst, the shift position Ps, the vehicle speed V, the gear position Pg, the lateral acceleration Glat, or the like. The command yaw moment Ycom is the command value of the yaw moment Y generated in the vehicle 10.

Then, in order to achieve the command yaw moment Ycom, the command left-right difference torque calculation unit 212 calculates the command left-right difference torque ΔTlatcom (also referred to as "command difference torque ΔTlatcom") as a difference between the command value Ttrclcom of the torque Ttrcl (first motive power parameter) of the left TRC motor 80l and the command value Ttrcrcom of the torque Ttrcr (second motive power parameter) of the right TRC motor 80r. As a method of calculating the command difference torque ΔTlatcom on the basis of the command yaw moment Ycom, for example, a formula shown in the paragraph [0090] of US 2013/0260956 A1 can be used.

(A-1-5-2-5. Motive Power Distribution Unit 214)

The motive power distribution unit 214 (command parameter calculation unit) calculates the command values Tengcom, Tcrkcom, Ttrclcom, and Ttrcrcom of the motive power (here, torques) of the engine 60 and the first to third motors 62, 80l, 80r by using the command vehicle motive power Fvcom, the command left-right difference torque ΔTlatcom, and the like.

In addition, the motive power distribution unit 214 controls the clutch 64 and the transmission 66 using the AP operation amount θap, the shift position Ps, the vehicle speed V, the engine speed Ne, the gear position Pg, or the like.

Travel modes used in the present embodiment include a motor travel mode in which the vehicle 10 is driven by the TRC MOTs 80l, 80r and an engine travel mode in which the vehicle 10 is driven mainly by the engine 60. The engine travel mode includes a hybrid mode in which additional motive power by the motors 62, 80l, 80r is added as necessary.

In the present embodiment, the motive power distribution unit 214 switches the travel mode mainly in accordance with the vehicle speed V and the AP operation amount θap. For example, the motive power distribution unit 214 selects the motor travel mode when the vehicle 10 travels at low speed and the AP operation amount θap does not exceed an operation amount threshold THθap. Furthermore, the motive power distribution unit 214 selects the engine travel mode when the vehicle 10 travels at medium or high speed and the AP operation amount θap does not exceed an operation amount threshold THθap. In addition, when the AP operation amount θap exceeds an operation amount threshold THθap in the engine travel mode, the hybrid mode is selected.

When the vehicle speed is low, the CRK motor 62 is driven by the engine 60 in a state that the engine 60 and the transmission 66 are disconnected (or connected) by the clutch 64, so that the electric power is generated by the CRK motor 62. The generated electric power can be supplied to the TRC motors 80l, 80r or an auxiliary machine that is not shown, can be stored in the battery 90. In other words, the CRK motor 62 can be used as an electric power generator.

The motive power distribution unit 214 controls the motive power of the engine 60 and the first to third motors 62, 80l, 80r using the AP operation amount θap or the like for each vehicle speed V. In the present embodiment, the motive power of the engine 60 and the first to third motors 62, 80l, 80r is controlled in torque [Nm]. However, the motive power of the engine 60 and the first to third motors 62, 80l, 80r may alternatively be controlled by the driving power in the unit of Newton (N).

Note that the command vehicle motive power calculation unit 210, the command left-right difference torque calculation unit 212, and the motive power distribution unit 214 may employ the structures as described in, for example, US 2013/0260956 A1 or JP 2015-107040 A.

(A-1-5-2-6. Monitor Unit 202)
(A-1-5-2-6-1. Summary of Monitor Unit 202)

The monitor unit 202 performs a left-right difference torque monitor control. In the left-right difference torque monitor control, the command motive power calculation unit 200 (or a command left-right difference torque ΔTtrccom output from the command motive power calculation unit 200) is monitored. In other words, the monitor unit 202 monitors an unintended turning movement (deflection) of the vehicle 10. Before each part of the monitor unit 202 is described, the monitoring of the monitor unit 202 is described.

Figure 4:
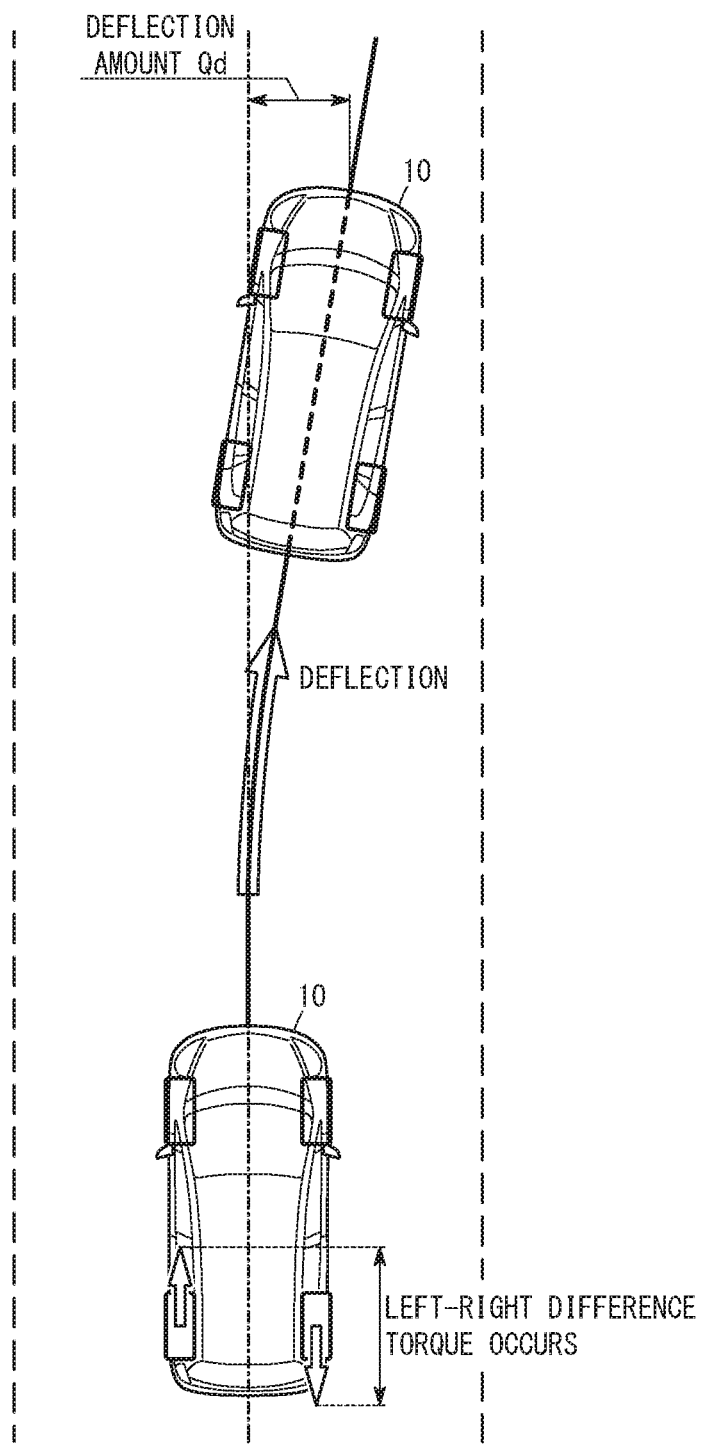
FIG. 4 is an explanatory diagram of an unintended turning movement (deflection) of the vehicle.

FIG. 4 is an explanatory diagram of an unintended turning movement (deflection) of the vehicle 10. To help the understanding, the vehicle 10 travels straight in FIG. 4. In the example of FIG. 4, the vehicle 10 should travel straight but because of an abnormality in the command vehicle motive power calculation unit 210, the command left-right difference torque ΔTlatcom corresponding to the difference between the command torques Ttrclcom and Ttrcrcom is a value that is not zero. Specifically, the command torque Ttrclcom of the left TRC motor 80l is a positive value and the command torque Ttrcrcom of the right TRC motor 80r is a negative value (both the command torques Ttrclcom and Ttrcrcom may be positive or both of them may be negative as will be described below). Thus, the left-right difference torque ΔTlat increases and the vehicle 10 deflects.

The monitor unit 202 in the present embodiment limits the output of the TRC motors 80l, 80r if a deflection amount Qd [m] of the vehicle 10 exceeds a deflection threshold THqd. More specifically, if the deflection amount Qd of the vehicle 10 exceeds the deflection threshold THqd, the monitor unit 202 sets the command torques Ttrclcom and Ttrcrcom of the TRC motors 80l, 80r to zero.

The deflection amount Qd is defined as the amount of displacement from a position where the vehicle 10 should exist after a predetermined time Px. In the present embodiment, the unit of deflection amount Qd is meters expressing the distance. Alternatively, the deflection amount Qd can be defined by time (seconds) until the deflection amount Qd exceeds the deflection threshold THqd. In this case, the deflection threshold THqd is also defined by time.

As illustrated in FIG. 3, the monitor unit 202 includes a command left-right difference torque calculation unit 220, a first left-right difference threshold calculation unit 222, an abnormality determination unit 224, an abnormality handling unit 226, and a torque reset unit 228.

(A-1-5-2-6-2. Command Left-Right Difference Torque Calculation Unit 220)

The command left-right difference torque calculation unit 220 (hereinafter also referred to as "command difference calculation unit 220") calculates a command left-right difference torque ΔTlatcom. The command difference torque ΔTlatcom is an absolute value of the difference between the command torque Ttrclcom of the left TRC motor 80l and the command torque Ttrcrcom of the right TRC motor 80r calculated by the command motive power calculation unit 200 (ΔTlatcom=|Ttrclcom−Ttrcrcom|).

Note that the command left-right difference torque ΔTlatcom (second command left-right difference torque ΔTlatcom2 or a target left-right difference torque) calculated by the command left-right difference torque calculation unit 220 of the monitor unit 202 is basically the same as the command left-right difference torque ΔTlatcom (first command left-right difference torque ΔTlatcom1) calculated by the command left-right difference torque calculation unit 212 of the command motive power calculation unit 200. Alternatively, the motive power distribution unit 214 may perform a predetermined correction on the first command left-right difference torque ΔTlatcom1 to obtain the second command left-right difference torque ΔTlatcom2.

In the present embodiment, in order to determine whether there is no abnormality in the second command left-right difference torque ΔTlatcom2 calculated by the command motive power calculation unit 200, the second command left-right difference torque ΔTlatcom2 is calculated without using the first command left-right difference torque ΔTlatcom1 on purpose. Alternatively, the first command left-right difference torque ΔTlatcom1 can be used directly.

As described below with reference to FIG. 13, the command torques Ttrclcom and Ttrcrcom that are limited by the maximum torques based on the specification of the motors 80l, 80r can be used.

(A-1-5-2-6-3. First Left-Right Difference Threshold Calculation Unit 222)

The first left-right difference threshold calculation unit 222 (hereinafter also referred to as "first threshold calculation unit 222") calculates a first left-right difference threshold THΔTcom1 (hereinafter also referred to as a first threshold THΔTcom1") as an allowable difference torque on the basis of the vehicle speed V.

Figure 5:
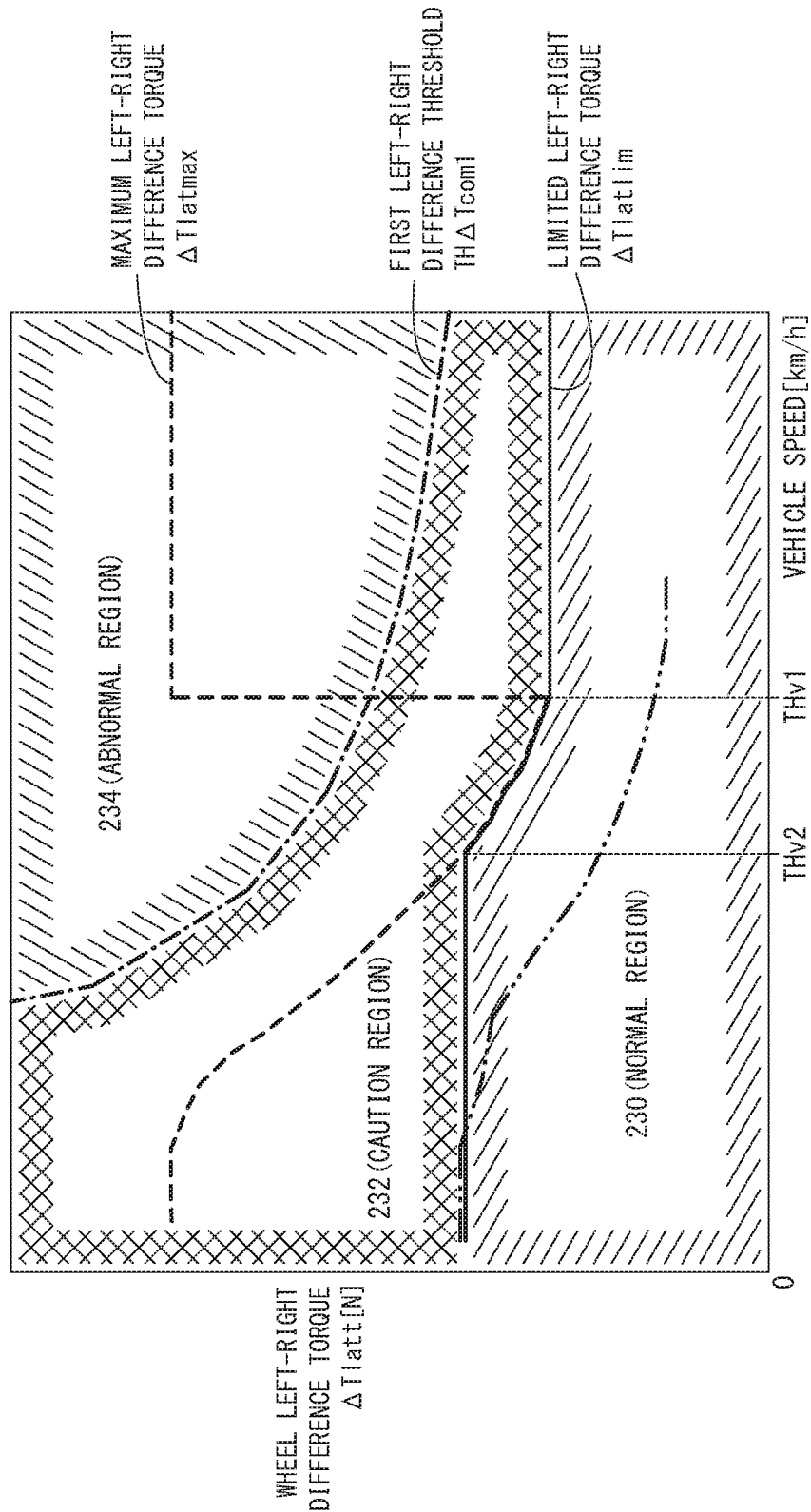
FIG. 5 is a diagram illustrating a first left-right difference threshold and the like in the embodiment.

FIG. 5 is a diagram illustrating the first left-right difference threshold THΔTcom1 and the like in the present embodiment. In FIG. 5, the horizontal axis indicates the vehicle speed V and the vertical axis indicates the left-right difference torque ΔTlat in the rear wheels 70l, 70r (hereinafter also referred to as "wheel left-right difference torque ΔTlatt"). The wheel left-right difference torque ΔTlatt is set based on the torques Ttrcl and Ttrcr of the motors 80l, 80r and the gear ratio between the decelerators 110l, 110r.

As illustrated in FIG. 5, in the present embodiment, a normal region 230, a caution region 232, and an abnormal region 234 are set based on the vehicle speed V and the wheel left-right difference torque ΔTlatt. The normal region 230 is used when the motive power distribution unit 214 is normal. In other words, the command motive power calculation unit 200 sets the command motor torques Ttrclcom and Ttrcrcom (first command motive power parameter, second command motive power parameter) so that the wheel left-right difference torque ΔTlatt is within the normal region 230.

The caution region 232 and the abnormal region 234 are regions that are set by the command motive power calculation unit 200 unintentionally. Among these regions, the caution region 232 allows the generation of the yaw moment Y by the left-right difference torque ΔTlat of the TRC motors 80l, 80r. In the abnormal region 234, the generation of the yaw moment Y by the left-right difference torque ΔTlat of the TRC motors 80l, 80r is prohibited and a diagnostic trouble code (DTC) is stored. The border between the caution region 232 and the abnormal region 234 corresponds to a first threshold THΔTcom1.

Note that DTC may also be stored in the caution region 232. In this case, in addition to the first threshold THΔTcom1, the first threshold calculation unit 222 calculates a second left-right difference threshold THΔTcom2 (caution determining difference torque) on the basis of the vehicle speed V.

In regard to the further details of a method of setting the abnormal region 234, description will be made with reference to FIG. 6 and FIG. 7.

FIG. 5 also shows a maximum left-right difference torque ΔTlatmax and a limit left-right difference torque ΔTlatlim. In regard to the maximum left-right difference torque ΔTlatmax, the TRC motors 80l, 80r are in the ring gear locked state from a vehicle speed V of zero to a first vehicle speed threshold THv1. Therefore, as the vehicle speed V increases, the maximum left-right difference torque ΔTlatmax decreases. When the vehicle speed V is more than or equal to the first vehicle speed threshold THv1, the TRC motors 80l, 80r are in the ring gear unlocked state. In the ring gear unlocked state, the TRC motors 80l, 80r are disconnected from a ring gear (not shown) and the rotation speed Ntrcl, Ntrcr [rpm] of the motors 80l, 80r is decreased; thus, the maximum left-right difference torque ΔTlatmax increases.

The limit left-right difference torque ΔTlatlim is an upper limit value of the left-right difference torque ΔTlat that the command motive power calculation unit 200 according to the present embodiment can set in the normal time. As illustrated in FIG. 5, the limit left-right difference torque ΔTlatlim is maintained constant between a vehicle speed V of zero and a second vehicle speed threshold THv2. Between the vehicle speed V of the second vehicle speed threshold THv2 and the first vehicle speed threshold THv1, the limit left-right difference torque ΔTlatlim is the same as the maximum left-right difference torque ΔTlatmax. When the vehicle speed V is more than or equal to the first vehicle speed threshold THv1, the limit left-right difference torque ΔTlatlim is maintained constant. As is clear from FIG. 5, the first left-right difference threshold THΔTcom1 is higher than the limit left-right difference torque ΔTlatlim.

(A-1-5-2-6-4. Abnormality Determination Unit 224)

The abnormality determination unit 224 in FIG. 3 determines whether to confirm the determination that the command left-right difference torque ΔTlatcom is abnormal. As illustrated in FIG. 3, the abnormality determination unit 224 includes a comparison unit 250 and a confirmation determination unit 252.

The comparison unit 250 compares the command difference torque ΔTlatcom (second command difference torque ΔTlatcom2) calculated by the command difference calculation unit 220 and the first threshold THΔTcom1 calculated by the first threshold calculation unit 222, and outputs a comparison result R. Specifically, the comparison unit 250 determines whether the command difference torque ΔTlatcom exceeds the first threshold THΔTcom1 (ΔTlatcom>THΔTcom1). When the command difference torque ΔTlatcom exceeds the first threshold THΔTcom1, the comparison unit 250 outputs an abnormality signal Sa. The abnormality signal Sa is a signal expressing that the command difference torque ΔTlatcom is in the abnormal region 234, and is included in the comparison result R. The abnormality signal Sa is output every time the command difference torque ΔTlatcom exceeds the first threshold THΔTcom1 (for every calculation cycle).

Note that when the comparison unit 250 determines whether the command difference torque ΔTlatcom belongs to the caution region 232 (FIG. 5), the comparison unit 250 determines whether the command difference torque ΔTlatcom exceeds the second threshold THΔTcom2 and is lower than or equal to the first threshold THΔTcom1 (THΔTcom2<ΔTlatcom THΔTcom1). When the command difference torque ΔTlatcom exceeds the second threshold THΔTcom2 and is lower than or equal to the first threshold THΔTcom1, the comparison unit 250 outputs the caution signal Sc. The caution signal Sc is a signal expressing that the command difference torque ΔTlatcom is in the caution region 232, and is included in the comparison result R. The caution signal Sc is output every time the command difference torque ΔTlatcom exceeds the second threshold THΔTcom2 (for every calculation cycle).

The confirmation determination unit 252 determines whether to confirm the determination that the command difference torque ΔTlatcom (second command difference torque ΔTlatcom2) is (continuously) in the abnormal region 234. For example, the confirmation determination unit 252 determines whether the abnormality signal Sa from the comparison unit 250 has continued for a first time threshold THp1 or more. When the abnormality signal Sa has continued for the first time threshold THp1 or more, the confirmation determination unit 252 confirms the determination that the command difference torque ΔTlatcom is (continuously) in the abnormal region 234.

Figure 9:
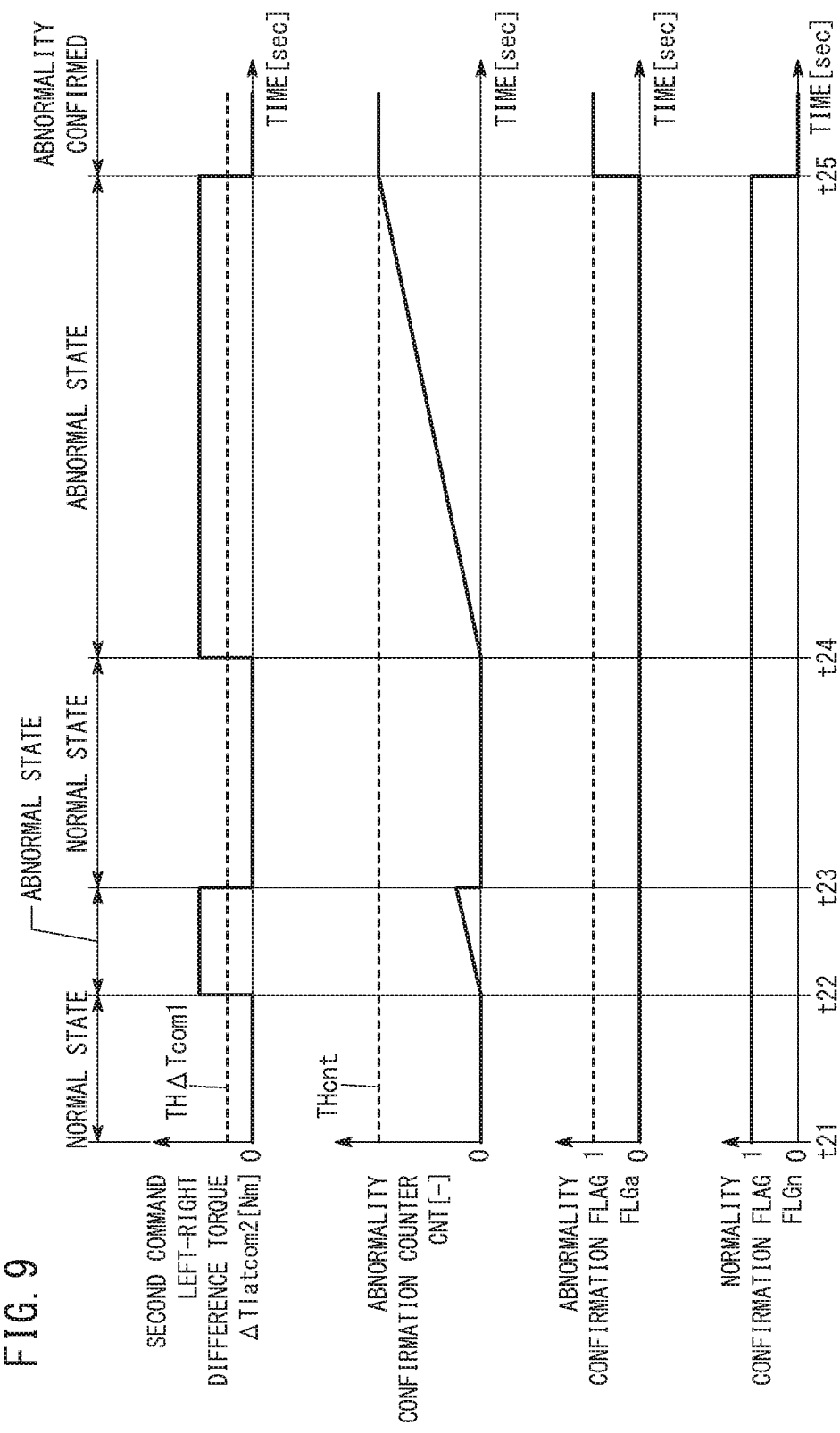
FIG. 9 is a timing chart expressing one example of a command left-right difference torque, an abnormality confirmation counter, an abnormality confirmation flag, and a normality confirmation flag in the case of employing a left-right difference torque monitor control in the embodiment.

Note that the confirmation determination unit 252 determines the time for which the abnormality signal Sa is received from the comparison unit 250, by using an abnormality confirmation counter CNT (FIG. 9). The first time threshold THp1 in the present embodiment is a fixed value regardless of the vehicle speed V. Alternatively, the first time threshold THp1 may be variable in accordance with the vehicle speed V (this similarly applies to a second time threshold THp2 to be described below). When the confirmation determination unit 252 has confirmed the determination that the command difference torque ΔTlatcom is (continuously) in the abnormal region 234, an abnormality confirmation flag FLGa is set to "1" (true) and a normality confirmation flag FLGn is set to "0" (false). When the determination is not confirmed yet, the abnormality confirmation flag FLGa is set to "0" (false) and the normality confirmation flag FLGn is set to "1" (true).

Note that the confirmation determination unit 252 may determine whether to confirm the determination that the command difference torque ΔTlatcom is (continuously) in the caution region 232. For example, the confirmation determination unit 252 determines whether the caution signal Sc from the comparison unit 250 has continued for the second time threshold THp2 or more. When the caution signal Sc has continued for the second time threshold THp2 or more, the confirmation determination unit 252 confirms the determination that the command difference torque ΔTlatcom is (continuously) in the caution region 232.

The confirmation determination unit 252 outputs a determination result D to the abnormality handling unit 226.

(A-1-5-2-6-5. Abnormality Handling Unit 226)

When the abnormality determination unit 224 has confirmed the determination that the command difference torque ΔTlatcom (second command difference torque ΔTlatcom2) is (continuously) in the abnormal region 234, the abnormality handling unit 226 handles the abnormality. Specifically, the abnormality handling unit 226 transmits a reset signal Sr to the torque reset unit 228. In addition to this or instead of this, the abnormality handling unit 226 may store DTC in the storage unit 174. The abnormality handling unit 226 may alternatively turn on a warning light that is not shown.

(A-1-5-2-6-6. Torque Reset Unit 228)

At the time of the reception of the reset signal Sr from the abnormality handling unit 226, the torque reset unit 228 resets the command TRC motor torques Ttrclcom and Ttrcrcom to zero. In other words, if not receiving the reset signal Sr from the abnormality handling unit 226, the torque reset unit 228 transmits the command torques Ttrclcom and Ttrcrcom from the motive power distribution unit 214 to the TRC motor ECUs 156*l*, 156*r* directly.

A-2. Procedure of Setting First Left-Right Difference Threshold THΔTcom1

[A-2-1. First]

Next, a procedure of setting the first left-right difference threshold THΔTcom1 is described. As described above, in the present embodiment, the normal region 230, the caution region 232, and the abnormal region 234 are set based on the vehicle speed V and the wheel left-right difference torque ΔTlatt (FIG. 5). The border between the caution region 232 and the abnormal region 234 corresponds to the first threshold THΔTcom1.

[A-2-2. Deflection Amount Qd]

Figure 6:
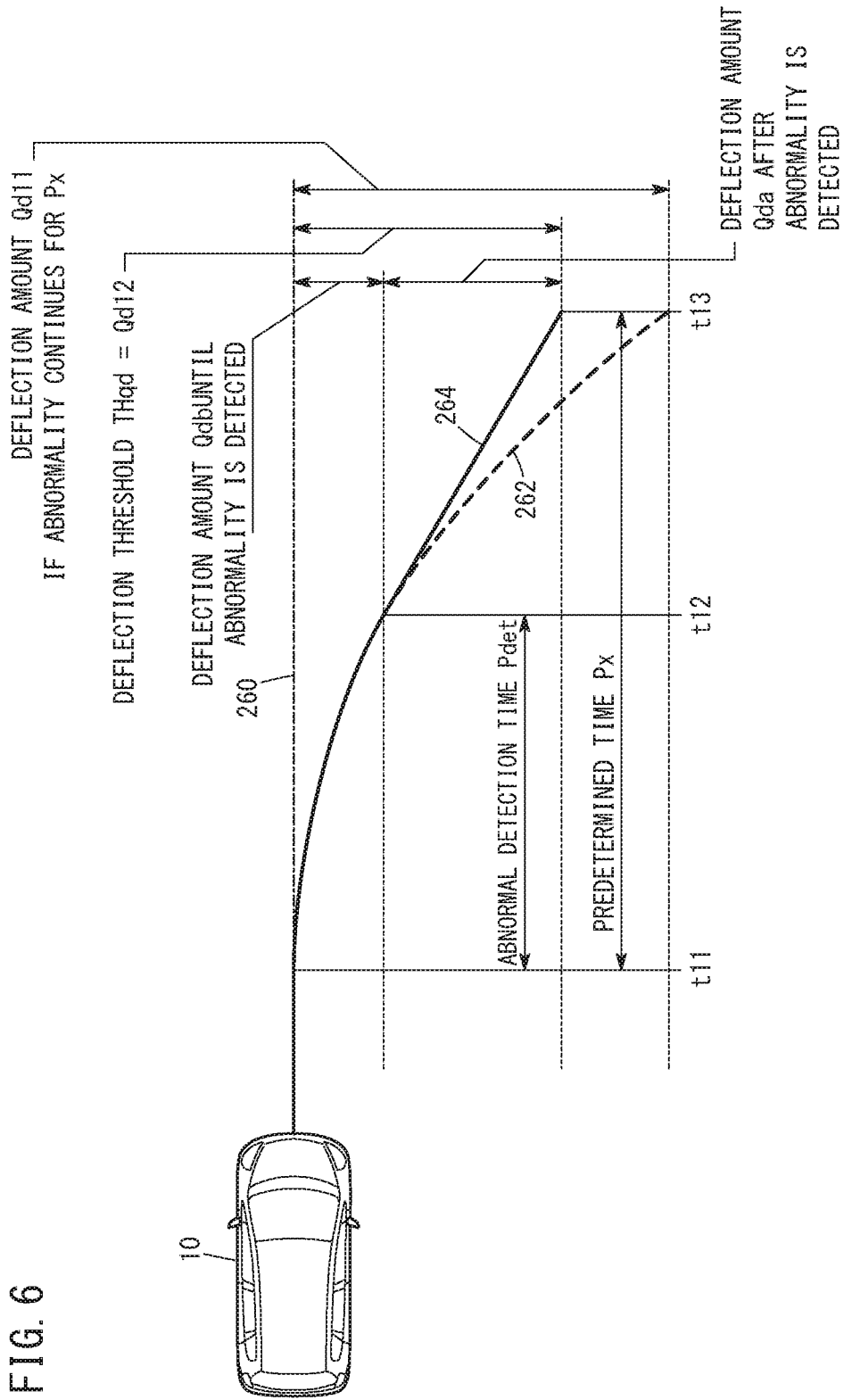
FIG. 6 is a diagram illustrating the deflection of the vehicle that travels straight in a control according to the embodiment and in a control according to a comparative example.

FIG. 6 is a diagram illustrating the deflection of the vehicle 10 that travels straight in the present embodiment and in a comparative example. In FIG. 6, a dot-chain line 260 indicates a travel trajectory of the vehicle 10 when the left-right difference torque ΔTlat is normal. In FIG. 6, a dashed line 262 indicates a travel trajectory of the vehicle 10 in the comparative example when the left-right difference torque ΔTlat is abnormal. In FIG. 6, a solid line 264 indicates a travel trajectory of the vehicle 10 in the present embodiment when the left-right difference torque ΔTlat is abnormal. As described above, in the present embodiment, when the abnormality of the left-right difference torque ΔTlat is confirmed, the torques of the TRC motors 80*l*, 80*r* are set to zero (see the torque reset unit 228 in FIG. 3). On the other hand, in the comparative example, the abnormality of the left-right difference torque ΔTlat is not determined.

In FIG. 6, a deflection amount Qd11 indicates the deflection amount Qd in the comparative example. In FIG. 6, a deflection amount Qd12 indicates a deflection threshold THqd corresponding to the deflection amount Qd that is allowable (allowable deflection amount Qd), and according to the present embodiment, the deflection amount Qd of the vehicle 10 is within the deflection threshold THqd. In the deflection amount Qd12 where the vehicle 10 moves for a predetermined time Px, a deflection amount Qdb indicates the deflection amount Qd until the abnormality is detected (or within an abnormality detection time Pdet), and a deflection amount Qda indicates the deflection amount Qd after the abnormality detection.

In FIG. 6, the deflection of the vehicle 10 starts at a time point t11. At a time point t12 where the abnormality is detected, the torques of the TRC motors 80*l*, 80*r* are set to zero in the present embodiment. Therefore, in the present embodiment, after the time point t12, the deflection due to the operation of the TRC motors 80*l*, 80*r* does not occur and the vehicle 10 therefore travels straight. Accordingly, the deflection amount Qd of the vehicle 10 is within the deflection threshold THqd. On the other hand, in the comparative example, the deflection due to the operation of the TRC motors 80*l*, 80*r* continues even after the time point t12; therefore, at a time point t13 after the elapse of the predetermined time Px, the deflection amount Qd exceeds the deflection threshold THqd. Note that the time between the time points t11 and t12 (abnormality detection time Pdet) corresponds to the first time threshold THp1 described above in regard to the abnormality determination unit 224.

[A-2-3. First Threshold THΔTcom1]

As described above, in the present embodiment, the first left-right difference threshold THΔTcom1 is set for each vehicle speed V (FIG. 5). This causes the deflection amount Qd of the vehicle 10 to be within the deflection threshold THqd at any vehicle speed V. In the present embodiment, the deflection threshold THqd is a variable value in accordance with the vehicle speed V (the details will be described with reference to FIG. 8). Alternatively, the deflection threshold THqd may be a constant value regardless of the vehicle speed V.

Figure 7:
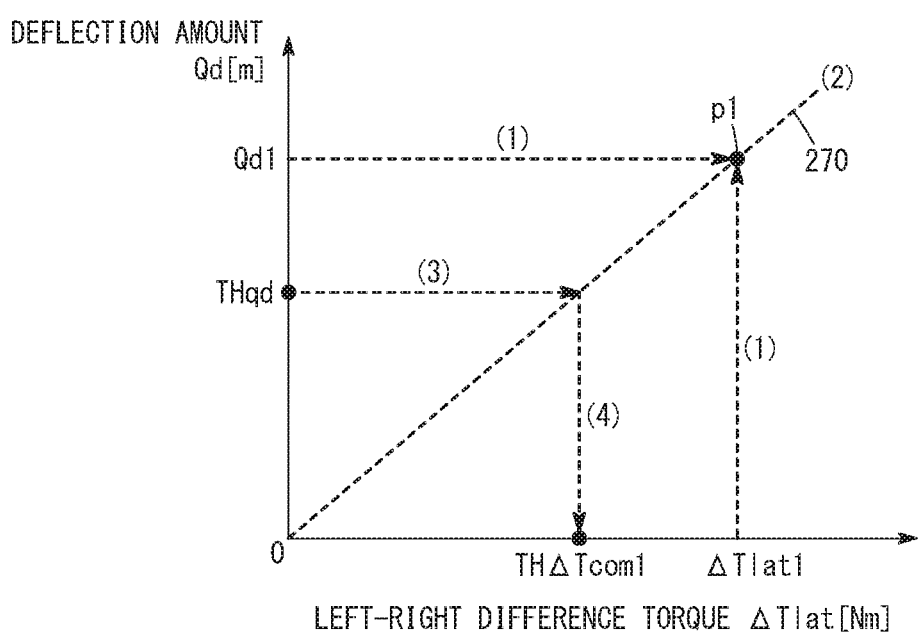
FIG. 7 is a diagram for describing a procedure of setting the first left-right difference threshold in the embodiment on the basis of actual measurement values of the deflection amount.
Figure 8:
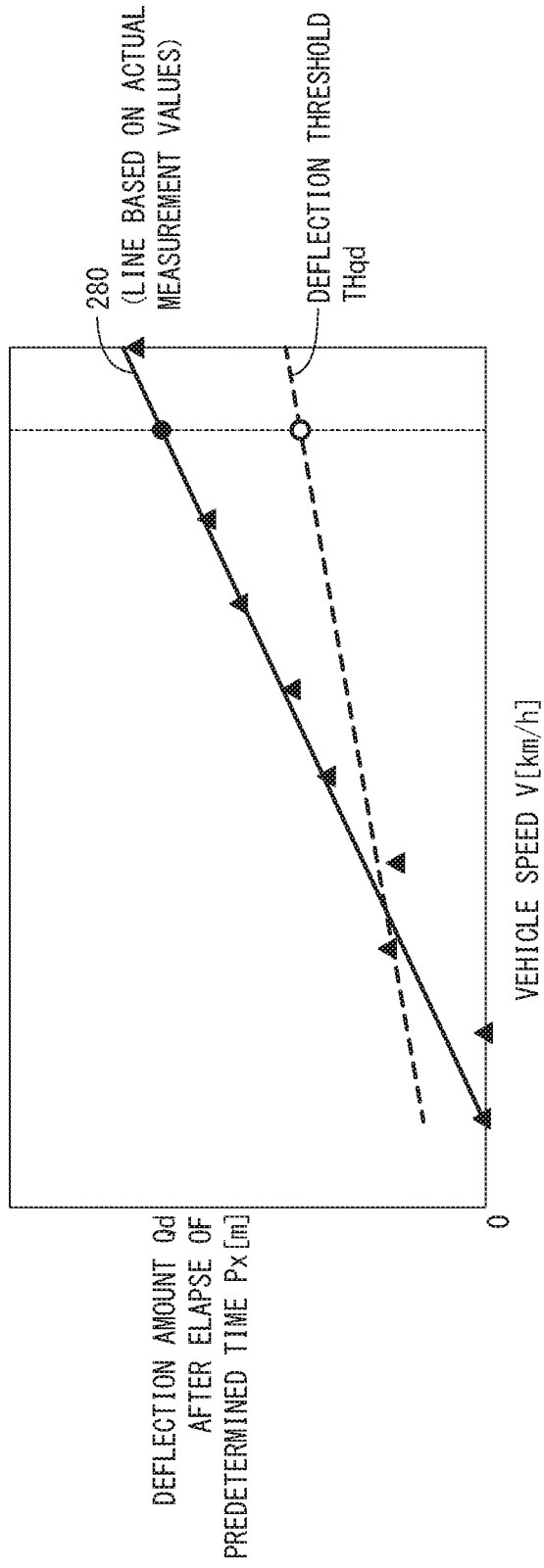
FIG. 8 is a diagram expressing a relation between a vehicle speed and the deflection amount of the vehicle after the elapse of a predetermined time, for each left-right difference torque.

FIG. 7 is a diagram for describing a procedure of setting the first left-right difference threshold THΔTcom1 in the present embodiment on the basis of actual measurement values of the deflection amount Qd. In FIG. 7, the horizontal axis indicates the left-right difference torque ΔTlat and the vertical axis indicates the deflection amount Qd. FIG. 8 is a diagram expressing the relation between the vehicle speed V and the deflection amount Qd of the vehicle 10 after the elapse of the predetermined time Px, for each left-right difference torque ΔTlat. In FIG. 8, a dashed line indicates a characteristic when the left-right difference torque ΔTlat is the first left-right difference threshold THΔTcom1. In FIG. 8, a solid line 280 indicates a characteristic when the left-right difference torque ΔTlat is a particular value higher than the first left-right difference threshold THΔTcom1.

In FIG. 7, first, the deflection amount Qd after the elapse of the predetermined time Px in a state that a certain left-right difference torque ΔTlat (hereinafter referred to as "left-right difference torque ΔTlat1") is generated intentionally at a certain vehicle speed V1 (this deflection amount Qd is hereinafter referred to as "deflection amount Qd1") is obtained (process (1) in FIG. 7). Then, a line 270 is drawn connecting between an origin and a coordinate p1 of a combination of the left-right difference torque ΔTlat1 and the deflection amount Qd1 (process (2) in FIG. 7). In addition, the left-right difference torque ΔTlat for the deflection threshold THqd on the line 270 is specified (process (3) in FIG. 7), and this is defined as the first left-right difference threshold THΔTcom1 (process (4) in FIG. 7). The above processes are performed for a plurality of vehicle speeds V. As a result, the first left-right difference threshold THΔTcom1 as shown in FIG. 5 is obtained.

The above processes can be expressed by the following formula (1):

$$TH\Delta Tcom1 = (\Delta Tlat1 \cdot THqd)/Qd1 \qquad (1)$$

A-3. One Example of Control

FIG. 9 is a timing chart expressing one example of the command left-right difference torque ΔTlatcom (second command difference torque ΔTlatcom2), the abnormality confirmation counter CNT, the abnormality confirmation flag FLGa, and the normality confirmation flag FLGn in the case of employing the left-right difference torque monitor control in the present embodiment. Between the time points t21 and t22, the state is normal, that is, the command left-right difference torque ΔTlatcom does not exceed the first left-right difference threshold THΔTcom1. Therefore, the abnormality confirmation counter CNT of the confirmation determination unit 252 remains "0" (false). In the example of FIG. 9, the normality confirmation flag FLGn is "1" (true) at the time point t21.

At the time point t22, the command left-right difference torque ΔTlatcom suddenly increases and exceeds the first left-right difference threshold THΔTcom1. Along with this, the abnormality confirmation counter CNT counts up. At the time point t23, the command difference torque ΔTlatcom suddenly decreases and becomes lower than the first threshold THΔTcom1. Along with this, the abnormality confirmation counter CNT is reset. Between the time points t23 and t24, the state becomes normal again.

At the time point t24, the command difference torque ΔTlatcom suddenly increases again and exceeds the first threshold THΔTcom1. Along with this, the abnormality confirmation counter CNT counts up. From the time point t24 to the time point t25, the state in which the command left-right difference torque ΔTlatcom exceeds the first left-right difference threshold THΔTcom1 continues and the abnormality confirmation counter CNT is more than or equal to an abnormality confirmation counter threshold THcnt. Along with this, the abnormality determination is confirmed, the abnormality confirmation flag FLGa becomes "1" indicating true, and the normality confirmation flag FLGn becomes "0" indicating false.

Along with this, the abnormality handling unit 226 transmits the reset signal Sr to the torque reset unit 228 (see FIG. 3). The torque reset unit 228 having received the reset signal Sr sets the command motor torques Ttrclcom and Ttrcrcom to zero. Therefore, after the time point t25, the command difference torque ΔTlatcom is zero.

A-4. Effect of the Present Embodiment

As described above, in the present embodiment, when the second command left-right difference torque ΔTlatcom2 (object left-right difference parameter) exceeds the first left-right difference threshold THΔTcom1, the motive power of the TRC motors 80l, 80r (first rotary electric machine and second rotary electric machine) is limited (see FIG. 3, the solid line 264 in FIG. 6, and FIG. 9). Thus, if it is possible to determine that there is an abnormality in the left-right difference torque ΔTlat (or command yaw moment Ycom) due to some reason, the motive power of the vehicle 10 can be controlled suitably by limiting the torques Ttrcl and Ttrcr of the TRC motors 80l, 80r.

Furthermore, since the second command left-right difference torque ΔTlatcom2 as the command value is the object, the abnormality of the left-right difference ΔTlat can be determined quickly.

In the present embodiment, the motive power control unit 26 includes the command vehicle motive power calculation unit 210 (command total parameter calculation unit) that calculates the command vehicle motive power Fvcom corresponding to the command value of the motive power of the entire vehicle 10, the command left-right difference torque calculation unit 212 (left-right difference calculation unit) that calculates the first command left-right difference torque ΔTlatcom1 (command left-right difference parameter), the motive power distribution unit 214 (command parameter calculation unit) that calculates the command motor torques Ttrclcom and Ttrcrcom on the basis of the command vehicle motive power Fvcom and the first command left-right difference torque ΔTlatcom1, and the TRC motor ECUs 156l, 156r (electric power control unit) that control the electric power to be supplied to the TRC motors 80l, 80r on the basis of the command motor torques Ttrclcom and Ttrcrcom (FIG. 3). When the second command left-right difference torque ΔTlatcom2 exceeds the first left-right difference threshold THΔTcom1, the monitor unit 202 decreases the electric power to be supplied to the TRC motor ECUs 156l, 156r so that the motive power of the TRC motor ECUs 156l, 156r is limited (see FIG. 3).

Thus, as compared to the case in which the motive power of the TRC motors 80l, 80r is limited by a mechanical structure, for example, the motive power of the TRC motors 80l, 80r can be limited by a relatively simple method.

In the present embodiment, the vehicle 10 includes the engine 60 and the CRK motor 62 (third motive power source) different from the TRC motors 80l, 80r (first rotary electric machine and second rotary electric machine) (see FIG. 1 to FIG. 3). When the monitor unit 202 limits the motive power of the TRC motors 80l, 80r, the motive power control unit 26 causes the vehicle 10 to continue to travel with one of or both the engine 60 and the CRK motor 62 (see FIG. 3 and the solid line 264 in FIG. 6). Thus, even when the motive power of the TRC motors 80l, 80r is limited, the travel of the vehicle 10 can be continued.

In the present embodiment, when the second command left-right difference torque ΔTlatcom2 (object left-right difference parameter) exceeds the first left-right difference threshold THΔTcom1, the monitor unit 202 decreases the torques Ttrcl and Ttrcr of the TRC motors 80l, 80r (first rotary electric machine and second rotary electric machine) to zero (see FIG. 3, the solid line 264 in FIG. 6, and FIG. 9). Thus, if it is determined that there is an abnormality in the TRC motors 80l, 80r due to some reason, the use of the TRC motors 80l, 80r can be canceled.

In the present embodiment, the monitor unit 202 changes the first left-right difference threshold THΔTcom1 in accordance with the vehicle speed V (FIG. 5). Thus, whether there is an abnormality in the left-right difference torque ΔTlat can be determined in accordance with the vehicle speed V.

B. Modifications

Note that the present invention is not limited to the embodiment described above, and various structures can be employed based on the description of the present specification. For example, structures as described below can be employed.

B-1. Vehicle 10 (to which the Present Invention is Applicable)

The vehicle 10 described in the above embodiment is an automobile with four wheels (FIG. 1). However, for example, the vehicle 10 is not limited to this automobile from the viewpoint that the motive power of the TRC motors 80*l*, 80*r* is limited when the second command left-right difference torque ΔTlatcom2 exceeds the first left-right difference threshold THΔTcom1. For example, the vehicle 10 may be an automobile with three wheels or an automobile with six wheels.

In the above embodiment, the vehicle 10 includes one engine 60 and three motors 62, 80*l*, 80*r* as a driving source (prime mover) (FIG. 1). However, for example, the present invention is not limited to this structure from the viewpoint that the motive power of the TRC motors 80*l*, 80*r* is limited when the second command left-right difference torque ΔTlatcom2 exceeds the first left-right difference threshold THΔTcom1. For example, the vehicle 10 may include only the TRC motors 80*l*, 80*r* as the driving source. In such a structure, when the second command left-right difference torque ΔTlatcom2 exceeds the first left-right difference threshold THΔTcom1, the command motor torques Ttrclcom and Ttrcrcom may be gradually decreased to zero.

B-2. Driving System 20 (Torque Vectoring Mechanism 100)

In the above embodiment, the front wheels 50 are driven by the front-wheel driving device 30 including the engine 60 and the first motor 62, and the rear wheels 70 are driven by the rear-wheel driving device 32 including the second and third motors 80*l*, 80*r* (FIG. 1). However, for example, the present invention is not limited to this structure from the viewpoint that the motive power of the TRC motors 80*l*, 80*r* is limited when the second command left-right difference torque ΔTlatcom2 exceeds the first left-right difference threshold THΔTcom1.

[B-2-1. First Modificationυ

Figure 10:
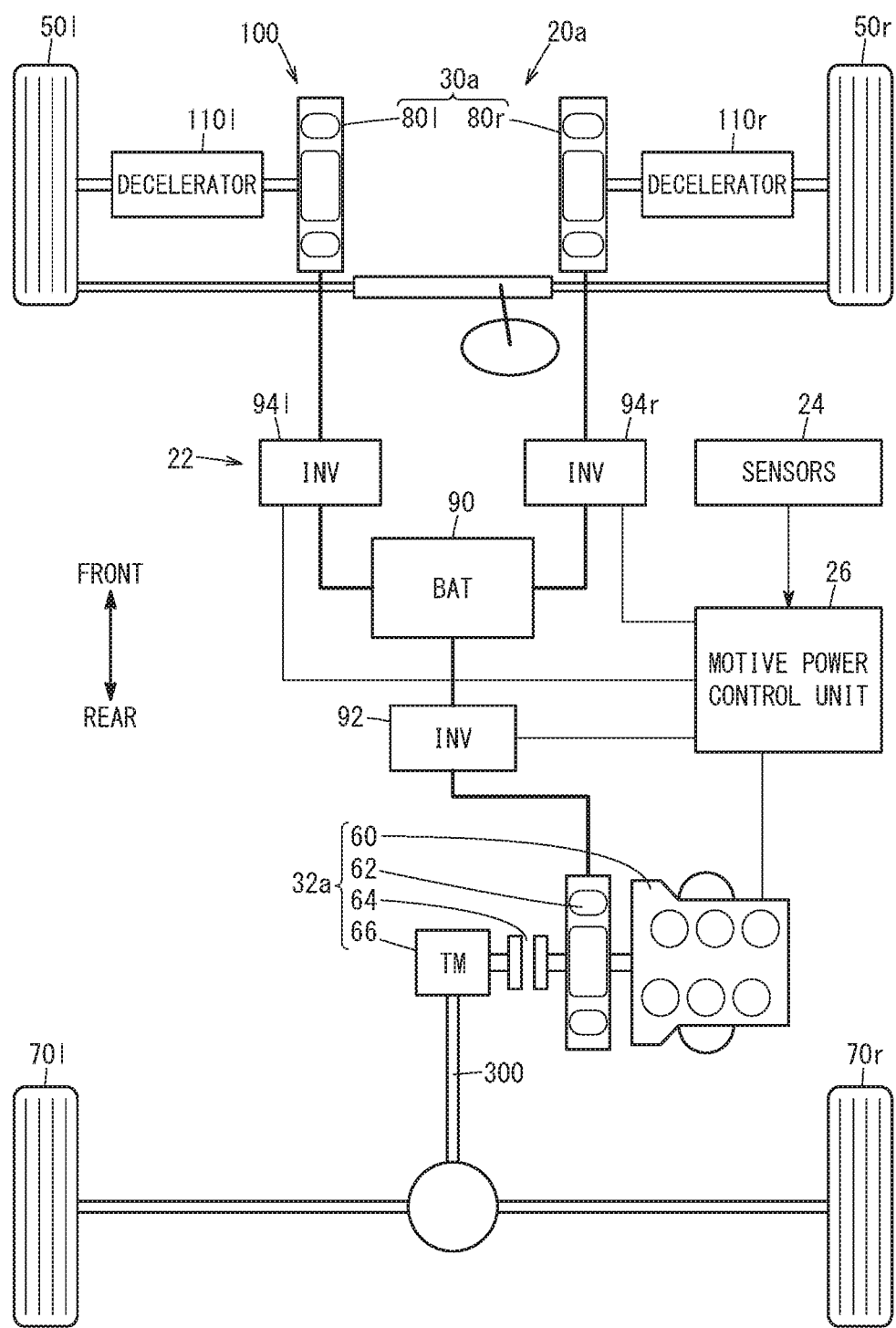
FIG. 10 is a schematic structure diagram illustrating a part of a vehicle according to a first modification of the present invention.

FIG. 10 is a schematic structure diagram illustrating a part of a vehicle 10A according to a first modification of the present invention. The structures of the front-wheel driving device 30 and the rear-wheel driving device 32 of the vehicle 10 in the above embodiment are opposite in a driving system 20*a* of the vehicle 10A. That is to say, a front-wheel driving device 30*a* includes the second and third traction motors 80*l*, 80*r* disposed on the front side of the vehicle 10A (torque vectoring mechanism 100). A rear-wheel driving device 32*a* of the vehicle 10A includes the engine 60 and the first traction motor 62 that are disposed in series on the rear side of the vehicle 10A.

Although the engine 60 and the first traction motor 62 are disposed near the rear wheels 70 in FIG. 10 in order to clarify the connection relation with the rear wheels 70, the engine 60 and the first traction motor 62 may be disposed in an engine compartment (not shown) provided on the front side of the vehicle 10. The transmission 66 may be connected to the rear wheels 70 through a propeller shaft 300.

[B-2-2. Second Modification]

Figure 11:
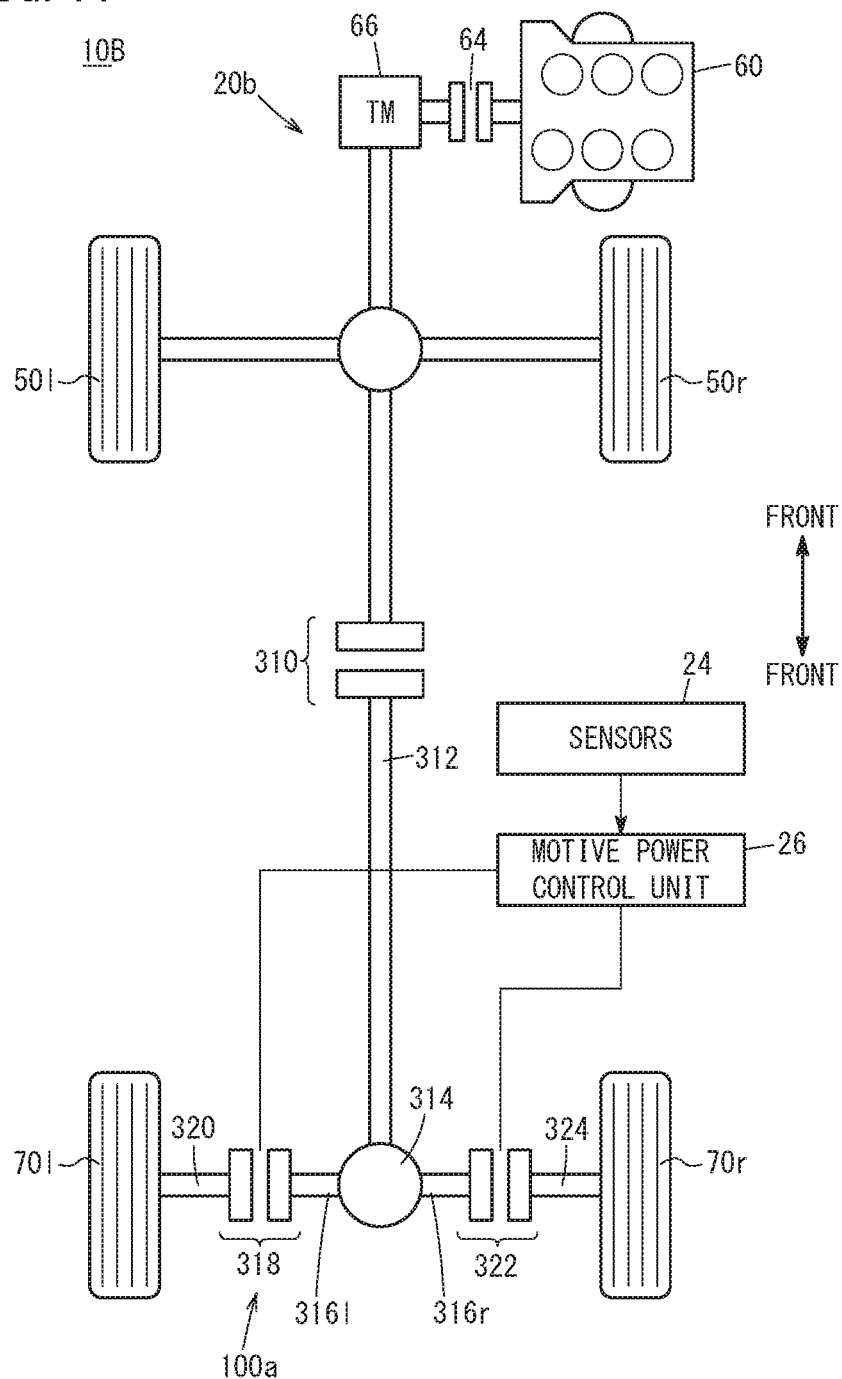
FIG. 11 is a schematic structure diagram illustrating a part of a vehicle according to a second modification of the present invention.

FIG. 11 is a schematic structure diagram illustrating a part of a vehicle 10B according to a second modification of the present invention. In a driving system 20*b* of the vehicle 10B, the driving power from the engine 60 (hereinafter referred to as "driving power Feng") is transmitted to the front wheels 50*l*, 50*r* and the rear wheels 70*l*, 70*r*. Thus, in addition to the front wheels 50*l*, 50*r* (main driving wheels), the rear wheels 70*l*, 70*r* (sub-driving wheels) serve as the driving wheels. Note that in a manner similar to the embodiment (FIG. 1), the first motor 62 may be connected to the engine 60.

The vehicle 10B includes a transfer clutch 310, a propeller shaft 312, a differential gear 314, differential gear output shafts 316*l*, 316*r* (hereinafter also referred to as output shafts 316*l*, 316*r*), a first clutch 318, a left output shaft 320, a second clutch 322, and a right output shaft 324.

The transfer clutch 310 adjusts the driving power Feng from the engine 60 that is distributed to the rear wheels 70*l*, 70*r* through the propeller shaft 312. The differential gear 314 uniformly distributes the driving power Feng, which has been transmitted through the propeller shaft 312 for the rear wheels 70*l*, 70*r*, to the left and right output shafts 316*l*, 316*r*.

The first clutch 318 adjusts the degree of engagement on the basis of the command from the motive power control unit 26, and transmits the driving power from the output shaft 316*l* to the left output shaft 320 connected and fixed to the left rear wheel 70*l*. The second clutch 322 adjusts the degree of engagement on the basis of the command from the motive power control unit 26, and transmits the driving power from the output shaft 316*r* to the right output shaft 324 connected and fixed to the right rear wheel 70*r*. The first clutch 318, the second clutch 322, and the motive power control unit 26 form a torque vectoring mechanism 100*a*.

With such a structure, in the vehicle 10B, the driving power (torques) of the rear wheels 70*l*, 70*r* can be adjusted individually.

In the vehicle 10B according to the second modification, the engine 60 (prime mover) and the left rear wheel 70*l* (left driving wheel) are connected through the first clutch 318 (first motive power transmission mechanism). The engine 60 and the right rear wheel 70*r* (right driving wheel) are connected through the second clutch 322 (second motive power transmission mechanism). In regard to the first clutch 318 and the second clutch 322, the connected state and the disconnected state can be switched simply and additionally, the connected state and the disconnected state can be switched in multiple positions by adjusting the degree of sliding.

The motive power control unit 26 controls the first clutch 318 and the second clutch 322 on the basis of the time differential value [degrees/sec] of the steering angle θst, for example, and thus adjusts the left-right difference torque ΔTlat between the left rear wheel 70*l* and the right rear wheel 70*r*.

The first clutch 318 can switch between the connected state in which the motive power is transmitted between the engine 60 and the left rear wheel 70*l*, and the disconnected state in which the motive power is blocked between the engine 60 and the left rear wheel 70*l*. Similarly, the second clutch 322 can switch between the connected state in which the motive power is transmitted between the engine 60 and the right rear wheel 70*r*, and the disconnected state in which the motive power is blocked between the engine 60 and the right rear wheel 70*r*. Furthermore, the motive power control unit 26 switches between the connected state and the disconnected state of the first clutch 318 and the second clutch 322 on the basis of the EPS motor speed W, and thus adjusts the left-right difference torque ΔTlat between the left rear wheel 70*l* and the right rear wheel 70*r*.

As described above, the motive power control unit 26 adjusts the left-right difference torque ΔTlat between the left and right rear wheels 70*l*, 70*r* by connecting or disconnecting the first clutch 318 and the second clutch 322. Thus, by connecting and disconnecting the first clutch 318 and the second clutch 322, the left-right difference torque ΔTlat between the left and right rear wheels 70*l*, 70*r* can be adjusted. As a result, the left-right difference torque ΔTlat can be generated with high responsiveness.

[B-2-3. Third Modification]

Figure 12:
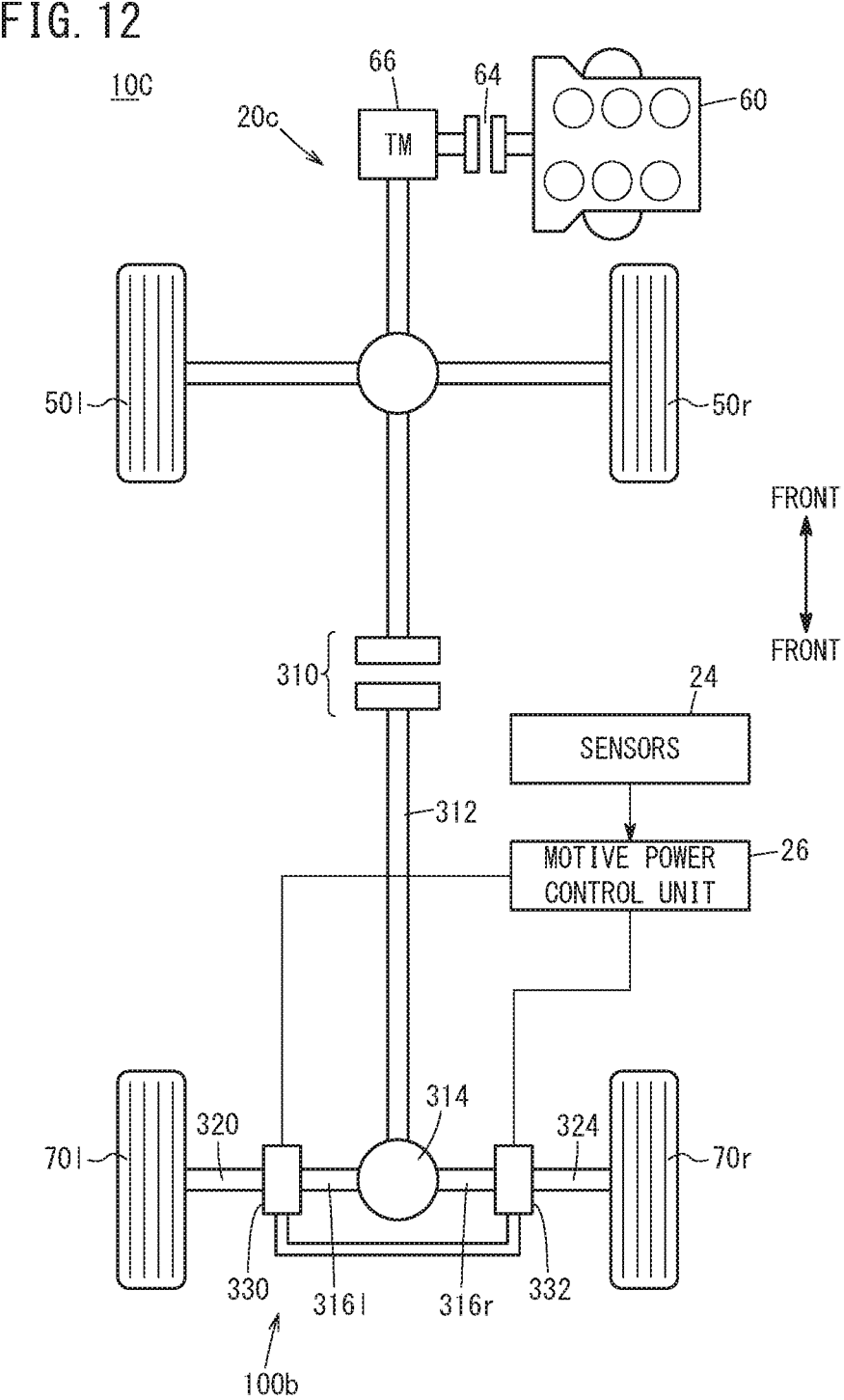
FIG. 12 is a schematic structure diagram illustrating a part of a vehicle according to a third modification of the present invention.

FIG. 12 is a schematic structure diagram illustrating a part of a vehicle 10C according to a third modification of the present invention. In a manner similar to the driving system 20*b* of the vehicle 10B according to the second modification, the driving power from the engine 60 (driving power Feng) is transmitted to the front wheels 50*l*, 50*r* and the rear wheels 70*l*, 70*r* in a driving system 20*c* of the vehicle 10C. Thus, in addition to the front wheels 50*l*, 50*r* (main driving wheels), the rear wheels 70*l*, 70*r* (sub-driving wheels) serve as the driving wheels. The components that are the same as those of FIG. 10B are denoted by the same reference symbols and the description is omitted. Note that in a manner similar to the embodiment (FIG. 1), the first motor 62 may be connected to the engine 60.

The vehicle 10C includes a first re-distribution mechanism 330 and a second re-distribution mechanism 332 in addition to the transfer clutch 310, the propeller shaft 312, the differential gear 314, the differential gear output shaft 316*l*, 316*r* (output shafts 316*l*, 316*r*), the left output shaft 320, and the right output shaft 324.

When the vehicle 10C turns left, the first re-distribution mechanism 330 transmits the driving power distributed or branched from the differential gear 314 for the left rear wheel 70*l* partly or entirely to the right rear wheel 70*r*. The first re-distribution mechanism 330 includes a left turning clutch, a left rear wheel sun gear, a triple pinion gear, and a right rear wheel sun gear (none of them are shown).

When the vehicle 10C turns right, the second re-distribution mechanism 332 transmits the driving power distributed or branched from the differential gear 314 for the right rear wheel 70*r* partly or entirely to the left rear wheel 70*l*. The second re-distribution mechanism 332 includes a right turning clutch, a right rear wheel sun gear, a triple pinion gear, and a left rear wheel sun gear (none of them are shown). The first re-distribution mechanism 330, the second re-distribution mechanism 332, and the motive power control unit 26 form a torque vectoring mechanism 100*b*.

In regard to the left turning clutch of the first re-distribution mechanism 330 and the right turning clutch of the second re-distribution mechanism 332, the connected state and the disconnected state can be switched simply and additionally, the connected state and the disconnected state can be switched in multiple positions by adjusting the degree of sliding.

With such a structure, in the vehicle 10C, the driving power of the rear wheels 70*l*, 70*r* can be adjusted individually.

[B-2-4. Others]

In the above embodiment, the combination of the engine 60 and the CRK MOT 62 is connected to the front wheels 50, and the TRC MOTs 80*l*, 80*r* are connected to the rear wheels 70 (FIG. 1). In the modification in FIG. 10, the combination of the engine 60 and the CRK MOT 62 is connected to the rear wheels 70, and the TRC MOTs 80*l*, 80*r* are connected to the front wheels 50. That is to say, the wheels (first wheels) to which the combination of the engine 60 and the CRK MOT 62 is connected are different from the wheels (second wheels) to which the TRC MOTs 80*l*, 80*r* are connected.

However, for example, the present invention is not limited to this structure from the viewpoint that the motive power of the TRC motors 80*l*, 80*r* is limited when the second command left-right difference torque ΔTlatcom2 exceeds the first left-right difference threshold THΔTcom1. For example, the engine 60, the CRK MOT 62, and the TRC MOTs 80*l*, 80*r* may be connected to the front wheels 50. In this case, the engine 60 and the CRK MOT 62 may be connected to the front wheels 50 through the clutch 64, and the TRC MOTs 80*l*, 80*r* may be connected to the front wheels 50 not through the clutch 64.

B-3. First to Third Traction motors 62, 80*l*, 80*r*

In the above embodiment, the first to third traction motors 62, 80*l*, 80*r* are a three-phase AC brushless type; however, the traction motors are not limited thereto. For example, the first to third traction motors 62, 80*l*, 80*r* may be a three-phase AC brush type, a single-phase AC type, or a DC type.

In the above embodiment, the electric power is supplied from the high-voltage battery 90 to the first to third traction motors 62, 80*l*, 80*r*; however, the electric power is additionally supplied from a fuel cell.

B-4. Control of Motive Power of Vehicle

[B-4-1. Procedure of Setting Command Vehicle Motive Power Fvcom]

In the above embodiment, it is assumed that the torques of the front-wheel driving device 30 and the rear-wheel driving device 32 are controlled based on the operation of a driver in the vehicle 10 (person who steers) on an accelerator pedal 102. However, for example, the present invention is not limited to this structure from the viewpoint of controlling the torques of the front-wheel driving device 30 and the rear-wheel driving device 32. For example, the present invention is also applicable to a structure in which the torques of the front-wheel driving device 30 and the rear-wheel driving device 32 are automatically controlled in the vehicle 10 (what is called automated driving). Note that the present invention is similarly applicable to a structure in which the driver remotely controls the vehicle 10 from the outside.

In the above embodiment, the motive power control unit 26 performs the control in which the torques of the front-wheel driving device 30 and the rear-wheel driving device 32 are calculated (FIG. 3). However, for example, the present invention is not limited to this structure from the viewpoint of controlling the motive power of the front-wheel driving device 30 and the rear-wheel driving device 32. For example, the motive power control unit 26 can perform the control in which, instead of torque, the output or the driving power that can be converted from or to the torque is calculated.

[B-4-2. Limiting Motive Power of TRC Motors 80*l*, 80*r*]

In the above embodiment, when the second command left-right difference torque ΔTlatcom2 (object left-right difference parameter) exceeds the first left-right difference threshold THΔTcom1, the monitor unit 202 decreases the command torques Ttrclcom and Ttrcrcom of the TRC motors 80*l*, 80*r* to zero (FIG. 3, the solid line 264 in FIG. 6, and FIG. 9). However, for example, the present invention is not limited to this structure from the viewpoint that the motive power of the TRC motors 80*l*, 80*r* is limited when the second command left-right difference torque ΔTlatcom2 exceeds the first left-right difference threshold THΔTcom1. For example, when the second command left-right difference torque ΔTlatcom2 exceeds the first left-right difference threshold THΔTcom1, the monitor unit 202 does not need to decrease the command torques Ttrclcom and Ttrcrcom of the TRC motors 80*l*, 80*r* to zero.

In this case, the monitor unit 202 may decrease the command left-right difference torque ΔTlatcom of the TRC motors 80*l*, 80*r* to zero. Thus, if it is determined that there is an abnormality in the TRC motors 80*l*, 80*r* due to some reason, the torque vectoring by the TRC motors 80*l*, 80*r* can be canceled.

[B-4-3. Command Difference Torque ΔTlatcom]

In the above embodiment, the second command difference torque ΔTlatcom2 is calculated as an absolute value of the difference between the command motor torques Ttrclcom and Ttrcrcom calculated by the command motive power calculation unit 200 (FIG. 3). However, for example, the present invention is not limited to this structure from the viewpoint of obtaining the difference between the torques Ttrcl and Ttrcr of the TRC motors 80*l*, 80*r*.

Figure 13:
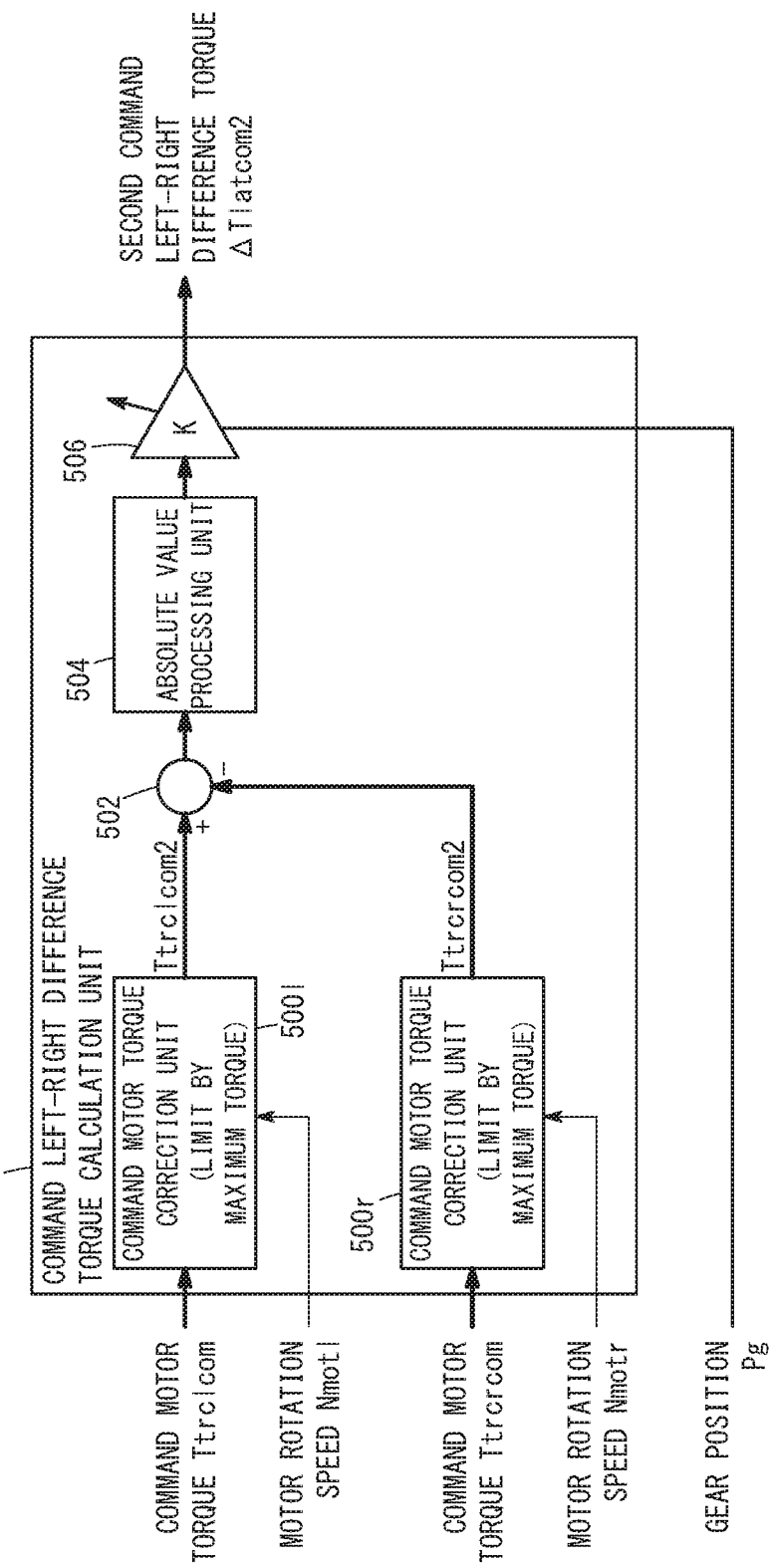
FIG. 13 is a diagram illustrating a structure of a command left-right difference torque calculation unit according to the modification.

FIG. 13 is a diagram illustrating a structure of a command left-right difference torque calculation unit 220*a* according to this modification. The command left-right difference torque calculation unit 220*a* (hereinafter also referred to as "command difference calculation unit 220") includes command motor torque correction units 500*l*, 500*r* (hereinafter also referred to as "correction units 500*l*, 500*r*"), a subtractor 502, an absolute value processing unit 504, and a gain 506.

The correction unit 500*l* limits the command motor torque Ttrclcom from the TRC motor ECU 156*l* by a left maximum torque Tmaxl of the left TRC motor 80*l* set based on a rotation speed Nmotl of the left TRC motor 80*l*. That is to say, by the limitation of the specification of the left TRC motor 80*l*, the left maximum torque Tmaxl for the rotation speed Nmotl exists. Therefore, in some cases, the command motor torque Ttrclcom from the TRC motor ECU 156*l* is not output directly and the command motor torque Ttrclcom is output just partly.

In view of this, the correction unit 500*l* includes a map expressing the relation between the rotation speed Nmotl and the left maximum torque Tmaxl (left maximum torque map) in the storage unit 174, and by using the left maximum torque map, calculates the left maximum torque Tmaxl. The correction unit 500*l* determines whether the command motor torque Ttrclcom is less than or equal to the left maximum torque Tmaxl. When the command motor torque Ttrclcom is less than or equal to the left maximum torque Tmaxl, the correction unit 500*l* outputs the command motor torque Ttrclcom directly as a correction command motor torque Ttrclcom2. When the command motor torque Ttrclcom is not less than or not equal to the left maximum torque Tmaxl, the correction unit 500*l* outputs the left maximum torque Tmaxl as the correction command motor torque Ttrclcom2.

Similarly, the correction unit 500*r* limits the command motor torque Ttrcrcom from the TRC motor ECU 156*r* by a right maximum torque Tmaxr of the right TRC motor 80*r* set based on a rotation speed Nmotr of the right TRC motor 80*r*.

The correction unit 500*r* includes a map expressing the relation between the rotation speed Nmotr and the right maximum torque Tmaxr (right maximum torque map) in the storage unit 174, and by using the right maximum torque map, calculates the right maximum torque Tmaxr. The correction unit 500*r* determines whether the command motor torque Ttrcrcom is less than or equal to the right maximum torque Tmaxr. When the command motor torque Ttrcrcom is less than or equal to the right maximum torque Tmaxr, the correction unit 500*r* outputs the command motor torque Ttrcrcom directly as a correction command motor torque Ttrcrcom2. When the command motor torque Ttrcrcom is not less than or not equal to the right maximum torque Tmaxr, the correction unit 500*r* outputs the right maximum torque Tmaxr as the correction command motor torque Ttrcrcom2.

The subtractor 502 calculates a difference between the left correction command motor torque Ttrclcom2 and the right correction command motor torque Ttrcrcom2, and outputs the difference to the absolute value processing unit 504. The absolute value processing unit 504 calculates an absolute value of this difference |Ttrclcom2−Ttrcrcom2| and outputs the absolute value to the gain 506. The gain 506 sets a multiplier K in accordance with a gear position Pg (gear ratio) and multiplies the absolute value by the multiplier K, and outputs the result as the second command left-right difference torque ΔTlatcom2.

[B-4-4. First Left-Right Difference Threshold THΔTcom1 (First Left-Right Difference Threshold)]

In the above embodiment, the first left-right difference threshold THΔTcom1 is set in accordance with the vehicle speed V (FIG. 5). However, for example, the present invention is not limited to this structure from the viewpoint that the motive power of the TRC motors 80*l*, 80*r* is limited when the second command left-right difference torque ΔTlatcom2 exceeds the first left-right difference threshold THΔTcom1. For example, the first left-right difference threshold THΔTcom1 may be a fixed value regardless of the vehicle speed V.

In the above embodiment, the first left-right difference threshold THΔTcom1 is set so that the deflection amount Qd after the elapse of the predetermined time Px does not exceed the deflection threshold THqd (FIG. 7). However, for example, the present invention is not limited to this structure from the viewpoint of determining that the second command left-right difference torque ΔTlatcom2 is abnormal. For example, the first left-right difference threshold THΔTcom1 may be set as a value expressing that the command left-right difference torque ΔTlatcom is clearly abnormal.

In the above embodiment, the second command left-right difference torque ΔTlatcom2 and the first left-right difference threshold THΔTcom1 are compared regardless of whether the vehicle 10 travels straight or travels on a curved road (or regardless of the shape of the road) (see FIG. 6). However, for example, the present invention is not limited to this structure from the viewpoint of comparing between the second command left-right difference torque ΔTlatcom2 and the first left-right difference threshold THΔTcom1 in accordance with the shape of the road.

Figure 14:
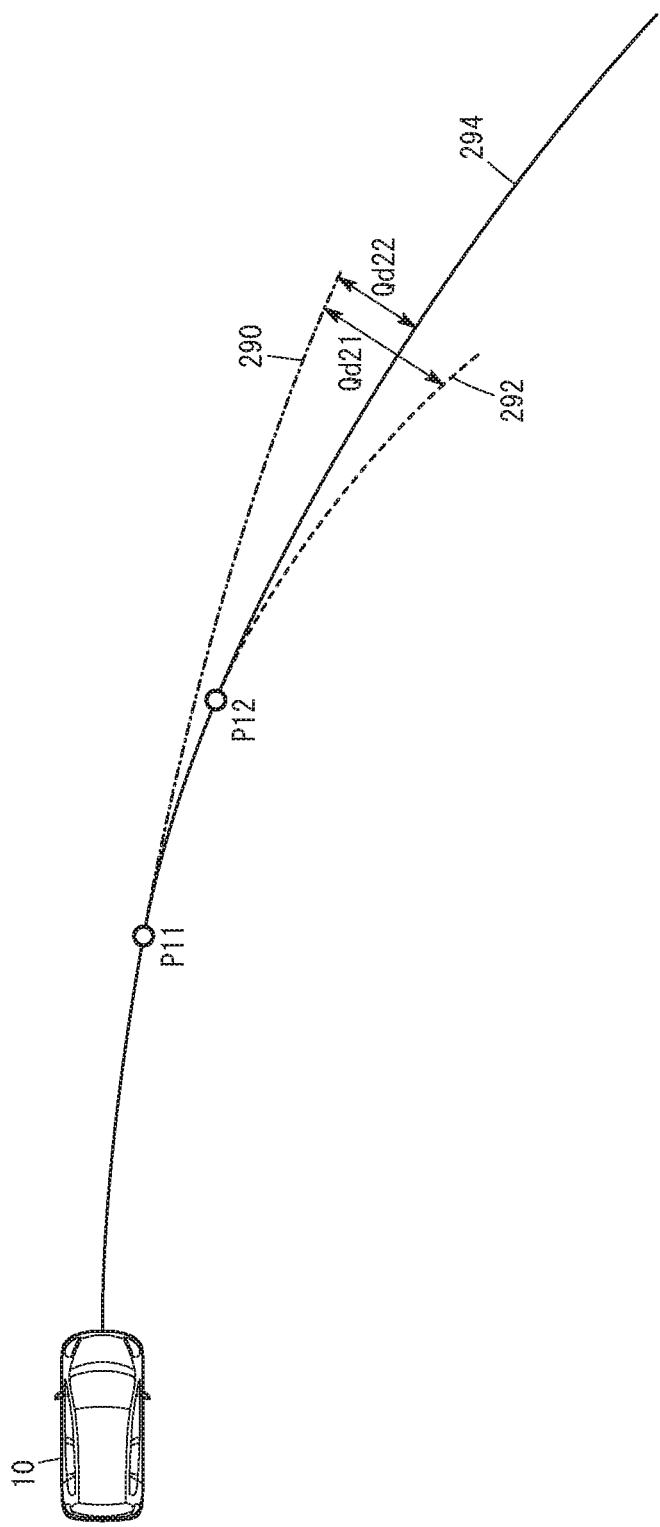
FIG. 14 is a diagram illustrating the deflection of the vehicle traveling on a curved road in each of a control according to the modification of the present invention and a control according to a comparative example.

FIG. 14 is a diagram illustrating the deflection of the vehicle 10 traveling on the curved road in each of a control according to the modification of the present invention and a control according to a comparative example. In FIG. 14, a dot-chain line 290 indicates a travel trajectory of the vehicle 10 when the left-right difference torque ΔTlat is normal. In FIG. 14, a dashed line 292 indicates a travel trajectory of the vehicle 10 in the comparative example when the left-right difference torque ΔTlat is abnormal. In FIG. 14, a solid line 294 indicates a travel trajectory of the vehicle 10 in the present modification when the left-right difference torque ΔTlat is abnormal.

In the above embodiment, the second command left-right difference torque ΔTlatcom2 and the first left-right difference threshold THΔTcom1 are simply compared (FIG. 3). On the other hand, in the present modification, when it is confirmed that an absolute value |ΔTlattar−ΔTlatcom2| of the difference between a target left-right difference torque ΔTlattar and the second command left-right difference torque ΔTlatcom2 is or will be more than or equal to a third left-right difference threshold THΔTcom3, the torques of the TRC motors 80l, 80r are set to zero. On the other hand, in the comparative example, the abnormality of the left-right difference torque ΔTlat is not determined.

In the present modification, the target left-right difference torque ΔTlattar is defined as a value that is expected in the state of the vehicle 10 at that time point. The target left-right difference torque ΔTlattar is calculated based on the current position Pc, a shape Sd of the road, the vehicle speed V (including the travel direction of the vehicle 10), and the like. The current position Pc is obtained by a navigation device that is not shown, for example. The shape Sd of the road is obtained from the navigation device, for example. Alternatively, the shape Sd of the road may be obtained by extracting a lane mark from an image photographed by a front camera that is not shown. The third left-right difference threshold THΔTcom3 may be a fixed value or a variable value in accordance with the vehicle speed V.

In FIG. 14, a deflection amount Qd21 corresponds to a deflection amount Qd in the comparative example after the elapse of the predetermined time Px from a point P11. In FIG. 14, a deflection amount Qd22 corresponds to the deflection amount Qd (deflection threshold THqd) that is allowable after the elapse of the predetermined time Px from the point P11, and according to the present modification, the command left-right difference torque ΔTlatcom is controlled so that the deflection amount Qd of the vehicle 10 is within the deflection threshold THqd.

In FIG. 14, the deflection of the vehicle 10 starts at the point P11. At a point P12, the torques of the TRC motors 80l, 80r are set to zero in the present modification. Therefore, in the present modification, after the point P12, the deflection due to the operation of the TRC motors 80l, 80r decreases and the deflection of the vehicle 10 becomes gradient. Accordingly, the deflection amount Qd after the elapse of the predetermined time Px from the point P11 is within the deflection threshold THqd. On the other hand, in the comparative example, the deflection due to the operation of the TRC motors 80l, 80r continues even after the point P12; therefore, the deflection amount Qd exceeds the deflection threshold THqd. Note that the time between the points P11 and P12 corresponds to the first time threshold THp1 described above in regard to the abnormality determination unit 224.

In the above embodiment and the modification based on FIG. 14, the control is performed focusing on the left-right difference torque ΔTlat. However, for example, the present invention is not limited to this structure from the viewpoint of making the deflection amount Qd of the vehicle 10 be within the deflection threshold THqd. For example, if it is confirmed that the deflection amount Qd corresponding to the distance between the target travel trajectory Ltar and the presumed travel trajectory La of the vehicle 10 after the elapse of the predetermined time Px is (or will be) more than or equal to the deflection threshold THqd, the torques of the TRC motors 80l, 80r may be set to zero.

The target travel trajectory Ltar is defined as an aggregation of positions that the vehicle 10 should follow. Either in the manual driving or the automated driving, the target travel trajectory Ltar is set to connect between reference positions of the road (for example, center of road) in a lateral direction (vehicle width direction). The target travel trajectory Ltar is calculated based on the current position Pc, the shape Sd of the road, the vehicle speed V (including the travel direction of the vehicle 10), and the like. The current position Pc is obtained by the navigation device that is not shown. The shape Sd of the road is obtained from the navigation device, for example. Alternatively, the shape Sd of the road may be obtained by extracting a lane mark from an image photographed by the front camera that is not shown.

In addition, the presumed travel trajectory La is calculated based on the current position Pc, the vehicle speed V (including the travel direction of the vehicle 10), the lateral acceleration Glat (and/or yaw rate Yr [degrees/sec]), and the like. The deflection threshold THqd may be a fixed value or a variable value in accordance with the vehicle speed V.

[B-4-5. Others]

In the above embodiment, when the numerals are compared, the formula includes or does not include an equal sign (for example, the determination by the comparison unit 250 in FIG. 3). However, for example, whether an equal sign is used to compare the numerals can be set arbitrarily unless using or not using the equal sign has a special meaning (i.e., if the effect of the present invention is obtained).

In this sense, for example, the determination by the comparison unit 250 as to whether the second command left-right difference torque ΔTlatcom2 is more than or equal to the first left-right difference threshold THΔTcom1 (ΔTlatcom2 THΔTcom1) can be replaced with the determination as to whether the second command left-right difference torque ΔTlatcom2 is more than the first left-right difference threshold THΔTcom1 (ΔTlatcom2>THΔTcom1). Similarly, the determination as to whether the abnormality confirmation counter CNT in the confirmation determination unit 252 is more than or equal to the abnormality confirmation counter threshold THcnt (CNT THcnt) can be replaced with the determination as to whether the abnormality confirmation counter CNT in the confirmation determination unit 252 is more than the abnormality confirmation counter threshold THcnt (CNT>THcnt).

C. Explanation of Reference Numerals 10, 10A, 10B, 10C: vehicle
26: motive power control unit
60: engine (third motive power source)
62: CRK motor (third motive power source)
70l: left rear wheel (driving wheel)
70r: right rear wheel (driving wheel)
80l: TRC motor (first rotary electric machine)
80r: TRC motor (second rotary electric machine)
100: torque vectoring mechanism
156l, 156r: TRC motor ECU (electric power control unit)
202: monitor unit
210: command vehicle motive power calculation unit (command total parameter calculation unit)
212: command left-right difference torque calculation unit (left-right difference calculation unit)
214: motive power distribution unit (command parameter calculation unit)
Fvcom: command vehicle motive power (command total parameter)
THΔTcom1: first left-right difference torque threshold (first left-right difference threshold)

Ttrclcom: command motor torque (first command motive power parameter)

Ttrcrcom: command motor torque (second command motive power parameter)

V: vehicle speed

ΔTlatcom2: second command left-right difference torque (object left-right difference parameter)

What is claimed is:

1. A vehicle comprising:
   a first rotary electric machine configured to generate motive power to be transmitted to a left driving wheel;
   a second rotary electric machine configured to generate motive power to be transmitted to a right driving wheel; and
   a motive power control unit configured to control the motive power of the first rotary electric machine and the second rotary electric machine;
   the motive power control unit comprising:
      a left-right difference calculation unit configured to calculate a command left-right difference parameter as a command value indicative of a difference between a first command motive power parameter corresponding to a first command value of a first motive power parameter expressing the motive power transmitted to the left driving wheel and a second command motive power parameter corresponding to a second command value of a second motive power parameter expressing the motive power transmitted to the right driving wheel;
      a motive power distribution unit configured to calculate the first command motive power parameter and the second command motive power parameter based on the command left-right difference parameter; and
      a monitor unit configured to monitor the left-right difference calculation unit or the motive power distribution unit,
      wherein the monitor unit:
         acquires an object left-right difference parameter corresponding to the command left-right difference parameter or a measurement left-right difference parameter as a difference between a first measurement value of the first command motive power parameter and a second measurement value of the second command motive power parameter which are calculated by the motive power distribution unit,
         compares the object left-right difference parameter with a first left-right difference threshold, and
         limits the motive power of the first rotary electric machine and the second rotary electric machine if the object left-right difference parameter exceeds the first left-right difference threshold.

2. The vehicle according to claim 1, the motive power control unit further comprising:
   a command total parameter calculation unit configured to calculate a command total parameter corresponding to a command value of a vehicle motive power parameter expressing motive power of the entire vehicle;
   a command parameter calculation unit configured to calculate the first command motive power parameter and the second command motive power parameter on a basis of the command total parameter and the command left-right difference parameter; and
   an electric power control unit configured to control electric power to be supplied to the first rotary electric machine on a basis of the first command motive power parameter, and to control electric power to be supplied to the second rotary electric machine on a basis of the second command motive power parameter,
   wherein the monitor unit is configured to, in response to determining that the object left-right difference parameter exceeds the first left-right difference threshold, limit the motive power of the first rotary electric machine and the second rotary electric machine by decreasing the electric power to be supplied to the first rotary electric machine and the second rotary electric machine.

3. The vehicle according to claim 1, further comprising a third motive power source that is different from the first rotary electric machine and the second rotary electric machine,
   wherein the motive power control unit is configured to, as the monitor unit limits the motive power of the first rotary electric machine and the second rotary electric machine, cause the vehicle to continue to travel by the motive power from the third motive power source.

4. The vehicle according to claim 3, wherein the monitor unit is configured to, in response to determining that the object left-right difference parameter exceeds the first left-right difference threshold, decrease the motive power of the first rotary electric machine and the second rotary electric machine to zero.

5. The vehicle according to claim 1, wherein the monitor unit is configured to, in response to determining that the object left-right difference parameter exceeds the first left-right difference threshold, decrease a left-right difference torque of the first rotary electric machine and the second rotary electric machine to zero.

6. The vehicle according to claim 1, wherein the monitor unit is configured to change the first left-right difference threshold in accordance with a vehicle speed of the vehicle.

7. A control method for a vehicle including a torque vectoring mechanism that changes a travel direction by adjusting a difference in motive power between a left driving wheel and a right driving wheel, the vehicle comprising:
   calculating, by a left-right difference calculation unit, a command left-right difference parameter as a command value indicative of a difference between a first command motive power parameter corresponding to a first command value of a first motive power parameter expressing motive power to be transmitted to the left driving wheel and a second command motive power parameter corresponding to a second command value of a second motive power parameter expressing motive power to be transmitted to the right driving wheel;
   calculating, by a motive power distribution unit, the first command motive power parameter and the second command motive power parameter based on the command left-right difference parameter;
   monitoring, by a monitor unit, the left-right difference calculation unit or the motive power distribution unit;
   acquiring, by the monitor unit, an object left-right difference parameter corresponding to the command left-right difference parameter or measurement left-right difference parameter as a difference between a first measurement value of the first motive power parameter and a second measurement value of the second command motive power parameter, calculated by the motive power distribution unit;
   comparing, by the monitor unit, the object left-right difference parameter with a first left-right difference threshold by the monitor unit; and
   in response to determining that the object left-right difference parameter exceeds the first left-right difference threshold, limiting, by the monitor unit, the motive power to be transmitted to the left driving wheel and the right driving wheel.

* * * * *